(12) United States Patent
Ji et al.

(10) Patent No.: US 12,224,439 B2
(45) Date of Patent: Feb. 11, 2025

(54) BORON-CONTAINING CHEMICALS AS CATHODE ADDITIVES, Si ANODE ADDITIVES, ELECTROLYTE ADDITIVES OR SEPARATOR MODIFIERS FOR Li-ION BATTERIES

(71) Applicant: Enevate Corporation, Irvine, CA (US)

(72) Inventors: Liwen Ji, Irvine, CA (US); Benjamin Park, Irvine, CA (US); Hong Zhao, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/508,514

(22) Filed: Oct. 22, 2021

(65) Prior Publication Data

US 2022/0131148 A1    Apr. 28, 2022

Related U.S. Application Data

(60) Provisional application No. 63/106,731, filed on Oct. 28, 2020.

(51) Int. Cl.
*H01M 4/58* (2010.01)
*H01M 4/38* (2006.01)
(Continued)

(52) U.S. Cl.
CPC ......... *H01M 4/5825* (2013.01); *H01M 4/386* (2013.01); *H01M 4/525* (2013.01);
(Continued)

(58) Field of Classification Search
CPC . H01M 4/5825; H01M 4/386; H01M 10/0525
See application file for complete search history.

(56) References Cited

U.S. PATENT DOCUMENTS

| | | | | |
|---|---|---|---|---|
| 5,891,592 | A * | 4/1999 | Mao ................... | H01M 10/0567 429/331 |
| 2012/0183866 | A1* | 7/2012 | Lee ..................... | H01M 4/1393 429/337 |

(Continued)

FOREIGN PATENT DOCUMENTS

| | | |
|---|---|---|
| JP | 61214374 A | 9/1986 |
| JP | 2009245829 | * 10/2009 |

(Continued)

OTHER PUBLICATIONS

International Search Report, PCT/US21/56501, dated Jan. 21, 2022, 14 pages.
(Continued)

*Primary Examiner* — Lucas J. O'Donnell
(74) *Attorney, Agent, or Firm* — McAndrews, Held & Malloy, Ltd.

(57) ABSTRACT

Electrodes, electrolytes and/or separators for energy storage devices comprising functional boron-containing chemicals are disclosed. The energy storage device comprises a first electrode and a second electrode, wherein at least one of the first electrode and the second electrode is a Si-based electrode, a separator between the first electrode and the second electrode, and an electrolyte composition. Functional boron-containing chemicals may serve as additives to one or more of the electrodes, electrolyte and/or separator.

18 Claims, 15 Drawing Sheets

(51) Int. Cl.
  *H01M 4/525* (2010.01)
  *H01M 10/0525* (2010.01)
  *H01M 4/02* (2006.01)

(52) U.S. Cl.
  CPC .. *H01M 10/0525* (2013.01); *H01M 2004/027* (2013.01); *H01M 2004/028* (2013.01); *H01M 2220/20* (2013.01)

(56) References Cited

U.S. PATENT DOCUMENTS

| | | |
|---|---|---|
| 2017/0338476 A1 | 11/2017 | Newbound et al. |
| 2019/0131655 A1* | 5/2019 | Haruna ................. H01M 4/485 |
| 2019/0181440 A1* | 6/2019 | Park .................. H01M 10/0525 |
| 2020/0136185 A1 | 4/2020 | Ji et al. |
| 2020/0148710 A1 | 5/2020 | Zhang et al. |
| 2022/0216513 A1* | 7/2022 | Tang ................. H01M 10/0565 |

FOREIGN PATENT DOCUMENTS

| | | | | |
|---|---|---|---|---|
| JP | 2009245829 A | * | 10/2009 | |
| WO | WO-2017185997 A1 | * | 11/2017 | ........ H01M 10/0525 |

OTHER PUBLICATIONS

Jang et al., Chemically-Induced Cathode-Electrolyte Interphase Created By Lithium Salt Coating on Nickel-Rich Layered Oxides Cathode, Journal of Power Sources, vol. 410-411, 2019, pp. 15-24.
Song et al., Artificial Cathode-Electrolyte Interphases on Nickel-Rich Cathode Materials Modified by Sily Functional Group, Journal of Power Sources, vol. 416, 2019, pp. 1-8.
International Preliminary Report on Patentability, PCT/US2021/056504, dated May 11, 2023, 13 pages.
"Triphenylboroxin | C18H15B3O3—PubChem," Web page <https://pubchem.ncbi.nlm.nih.gov/compound/Triphenylboroxin>, 20 pages, retrieved from Internet on Dec. 6, 2022.

* cited by examiner

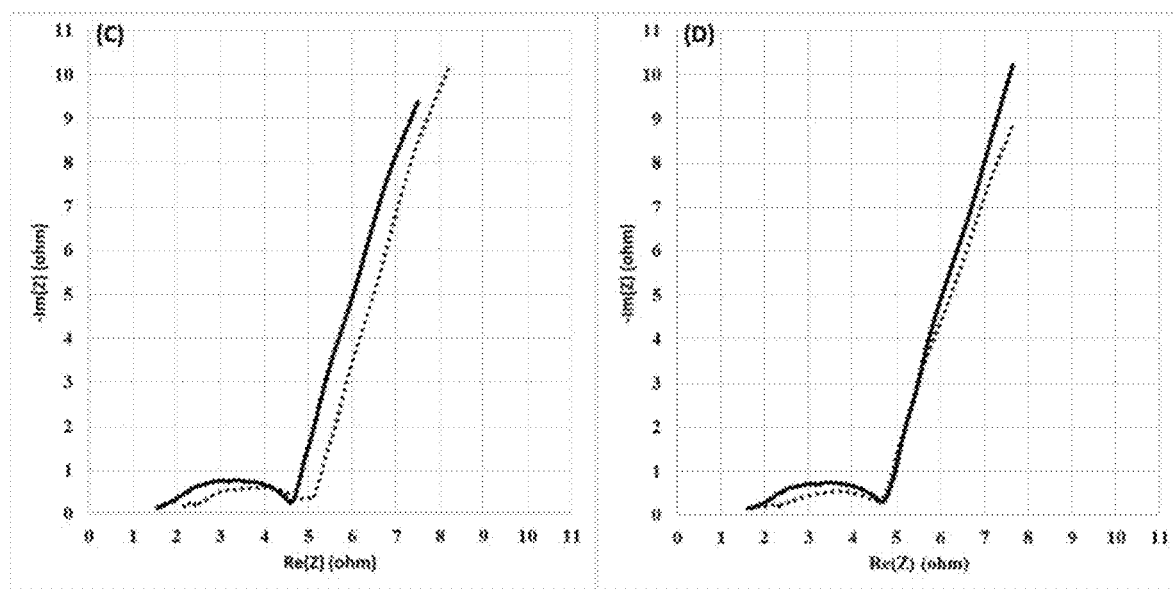
FIG. 4C     FIG. 4D

BORON-CONTAINING CHEMICALS AS CATHODE ADDITIVES, Si ANODE ADDITIVES, ELECTROLYTE ADDITIVES OR SEPARATOR MODIFIERS FOR Li-ION BATTERIES

CROSS-REFERENCE TO RELATED APPLICATIONS

This application claims the benefit of U.S. Provisional Application No. 63/106,731, filed Oct. 28, 2020. The entirety of the above referenced application is hereby incorporated by reference.

FIELD

The present application relates generally to electrodes, electrolytes and separators for energy storage devices such as batteries. In particular, the present application relates to electrodes, electrolytes and separators for use in lithium-ion energy storage devices with silicon-based anode materials.

BACKGROUND

Conventional approaches for battery electrodes, electrolytes and separators may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using functional boron-containing chemicals as electrode additives, electrolyte additives and/or separator modifiers for use in lithium-ion energy storage devices with silicon-based electrode materials, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 3A is a flow diagram of a coating process for fabricating a cell with a silicon-dominant electrode. FIG. 3B is a flow diagram for an alternative process for lamination of electrodes.

FIGS. 4A-4I show Nyquist plots of the NCM811 control (dotted line) and 1 wt % Lithium tetraphenylborate tris(1,2-dimethoxyethane) (LTPBT)-containing NCM811 cathode (solid line), -based coin half cells after the formation (4A), and after 5 cycles (4B), 10 cycles (4C), 25 cycles (4D), 50 cycles (4E), 100 cycles (4F), 130 cycles (4G), 150 cycles (4H), and 165 cycles (4I) cycling tests at 1 C/0.5 C with the voltage window of 4.2V-3.1V at room temperature, in accordance with an example embodiment of the disclosure.

DETAILED DESCRIPTION

Figure 1:
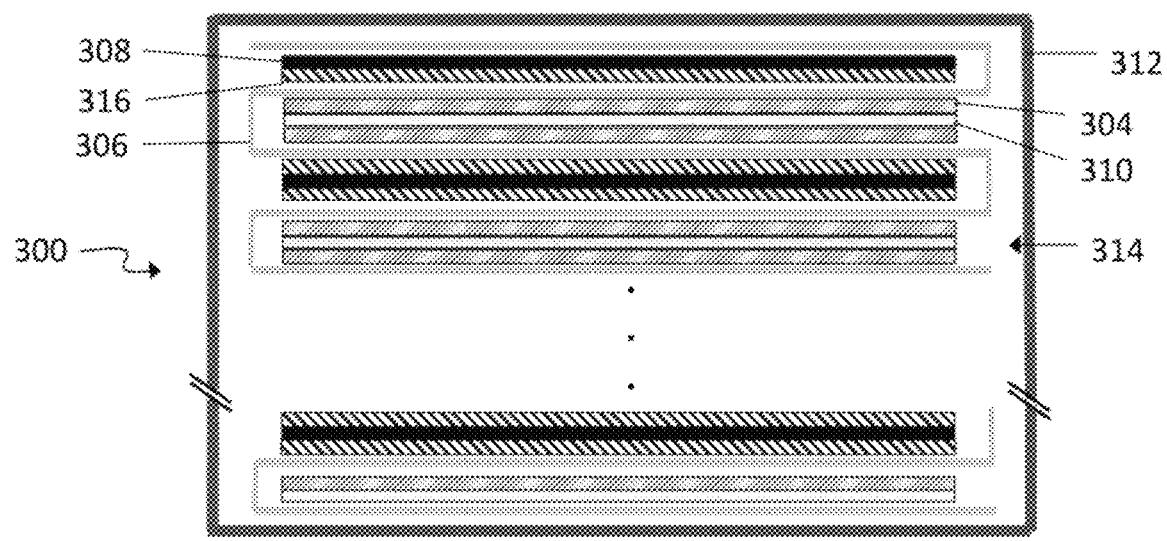
FIG. 1 is a cross-sectional schematic diagram of an example of a lithium ion battery, in accordance with an example embodiment of the disclosure.

As the demands for both zero-emission electric vehicles and grid-based energy storage systems increase, lower costs and improvements in energy density, power density, and safety of lithium (Li)-ion batteries are highly desirable. Enabling the high energy density and safety of Li-ion batteries requires the development of high-capacity, and high-voltage cathodes, high-capacity anodes and accordingly functional electrolytes with high voltage stability, interfacial compatibility with electrodes and safety.

A lithium-ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

Si is one of the most promising anode materials for Li-ion batteries due to its high specific gravimetric and volumetric capacity (3579 mAh/g and 2194 mAh/cm$^3$ vs. 372 mAh/g and 719 mAh/cm$^3$ for graphite), and low lithiation potential (<0.4 V vs. Li/Li$^+$). Among the various cathodes presently available, layered lithium transition-metal oxides such as Ni-rich LiNi$_x$Co$_y$Mn$_z$O$_2$ (NCM, 0≤x, y, z<1) or LiNi$_x$Co$_y$Al$_z$O$_2$ (NCA, 0≤x, y, z<1) are promising ones due to their high theoretical capacity (~280 mAh/g) and relatively high average operating potential (3.6 V vs Li/Li$^+$). In addition to Ni-rich NCM or NCA cathode, LiCoO$_2$ (LCO) is also a very attractive cathode material because of its relatively high theoretical specific capacity of 274 mAh g$^{-1}$, high theoretical volumetric capacity of 1363 mAh $cm^{-3}$, low self-discharge, high discharge voltage, and good cycling performance. Coupling Si anodes with high-voltage Ni-rich NCM (or NCA) or LCO cathodes can deliver more energy than conventional Li-ion batteries with graphite-based anodes, due to the high capacity of these new electrodes. However, both Si-based anodes and high-voltage Ni rich NCM (or NCA) or LCO cathodes face formidable technological challenges, and long-term cycling stability with high-Si anodes paired with NCM or NCA cathodes has yet to be achieved.

For anodes, silicon-based materials can provide significant improvement in energy density. However, the large volumetric expansion (>300%) during the Li alloying/dealloying processes can lead to disintegration of the active material and the loss of electrical conduction paths, thereby reducing the cycling life of the battery. In addition, an unstable solid electrolyte interphase (SEI) layer can develop on the surface of the cycled anodes, and leads to an endless exposure of Si particle surfaces to the liquid electrolyte. This results in an irreversible capacity loss at each cycle due to the reduction at the low potential where the liquid electrolyte reacts with the exposed surface of the Si anode. In addition, oxidative instability of the conventional non-aqueous electrolyte takes place at voltages beyond 4.5 V, which can lead to accelerated decay of cycling performance. Because of the generally inferior cycle life of Si compared to graphite, only a small amount of Si or Si alloy is used in conventional anode materials.

The NCM (or NCA) or LCO cathode usually suffers from an inferior stability and a low capacity retention at a high cut-off potential. The reasons can be ascribed to the unstable surface layer's gradual exfoliation, the continuous electrolyte decomposition, and the transition metal ion dissolution into electrolyte solution. The major limitations for LCO cathode are high cost, low thermal stability, and fast capacity fade at high current rates or during deep cycling. LCO cathodes are expensive because of the high cost of Co. Low thermal stability refers to exothermic release of oxygen when a lithium metal oxide cathode is heated. In order to make good use of Si anode//NCM or NCA cathode-, and Si anode//LCO cathode-based Li-ion battery systems, the aforementioned barriers need to be overcome.

One strategy for overcoming these barriers includes exploring new electrolyte additives in order to make good use of Si anode//NCM or NCA cathode-, and Si anode//LCO cathode-based full cells. The next generation of electrolyte additives to be developed should be able to form a uniform, stable SEI layer on the surface of Si anodes. This layer should have low impedance and be electronically insulating, but ionically conductive to Li-ion. Additionally, the SEI layer formed by the additive should have excellent elasticity and mechanical strength to overcome the problem of expansion and shrinkage of the Si anode volume. On the cathode side, the ideal additives should be oxidized preferentially to the solvent molecule in the bare electrolyte, resulting in a protective cathode electrolyte interphase (CEI) film formed on the surface of the Ni-rich NCM (or NCA) and LCO cathodes. At the same time, it should help alleviate the dissolution phenomenon of transition metal ions and decrease surface resistance on cathode side. In addition, they could help improve the physical properties of the electrolyte such as ionic conductivity, viscosity, and wettability.

As discussed above, Li-ion batteries are being intensively pursued in the electric vehicle markets and as stationary energy storage devices. To further improve the cell energy density, high-voltage layered transition metal oxide cathodes, examples including Ni-rich (e.g. NCA, NCM), Li-rich cathodes and high capacity and low-voltage anodes, such as Si, Ge, etc may be utilized. However, the performance deterioration of full cells, in which these oxides are paired with a Si or other high capacity anodes, increases markedly at potentials exceeding 4.30 V, limiting their wider use as high-energy cathode materials. Although a higher Ni content provides higher specific capacity for Ni-rich NCM or NCA cathodes, it involves surface instability because the unstable Ni4+ increase during the charging process. As it is favorable to convert the unstable Ni4+ into the more stable Ni3+ or Ni2+, Ni4+ triggers severe electrolyte decomposition at the electrode/electrolyte interface, leading to the reduction of Ni4+ and the oxidative decomposition of the electrolytes. Electrolyte decomposition at the electrolyte/electrode interface causes the accumulation of decomposed adducts on the NCM cathode surface. This hinders Li+ migration between the electrolyte and electrode, which in turn results in the rapid fading of the cycling performance. Thus the practical integration of a silicon anode in Li-ion batteries faces challenges such as large volume changes, an unstable solid-electrolyte interphase, electrolyte drying out, etc.

Attempts for improving the cathode surface properties, such as through-surface coating, surface doping, and use of electrolyte additives that effectively mitigate electrolyte decomposition at the interface, have been attempted. Most of these attempts are based on the cathode-electrolyte interface (CEI) concept, which does not permit electron-transfer reactions, but allows Li+ migration between the electrode and electrolyte.

The energy density, powder density, cycle life, etc. of Li-ion batteries is important as they affect the specifications of target electric vehicles such as the driving mileages, the stable time to operate, and the charging time. Electrode and electrolyte materials that allow high specific capacity and wide working potential are still needed. High energy electrode-based Li-ion full cells suffer from poor cycle life due to a wide variety of physical degradation mechanisms. As discussed above, application of a high content Si-containing anode can be hampered by large volume fluctuations and continuous side reactions on the Si surface during repeated lithiation and delithiation processes (leading to unstable SEI films).

High-voltage layered transitional metal oxide cathodes are generally challenged by two intrinsic problems: (i) oxygen evolution at high potentials or high temperatures; and (ii) inevitable presence of strongly alkaline Li residual compounds, mainly $Li_2O$, LiOH, and $Li_2CO_3$, which finally degrade the performance in Li-ion full cells. From the cathode aspect, strategies such as cation or anion doping for stabilizing the cathode material's lattice structure, surface coating for protecting cathode particles from parasitic reactions with the electrolyte components, synthesizing concentration-gradient or core-shell structures with high Ni content core for stabilizing the material's surface chemistry, as well as using electrolyte additives for chemically trapping the released oxygen can be used to overcome these issues and improve the full cell performance. The cathode-electrolyte interface (CEI) layer plays an important role in improving the surface stability of cathode materials. This is because the CEI layer effectively suppresses the electrolyte decomposition at the electrolyte/electrode interface, since it does not allow for the electron transfer reaction between the electrode and electrolyte to occur.

Another strategy is to develop and utilize specially functionalized film-forming electrolyte additives. The incorporation of a small number of functional additives may help modify the surface chemistry, circumvent the massive volume change and initial capacity loss due to the continuous electrolyte decomposition in high capacity and reactive electrode, such as Si anodes, Ni-rich NCA or NCM cathodes. Suitable reducible or oxidizable electrolyte additives are expected to modify the SEI or CEI interphases, respectively in Li-ion batteries, thus altering and tuning their composition and escorting the corresponding electrochemical properties, such as cycle life, rate capability, energy/power densities, etc. A further strategy for improving battery properties is to modify the separator, which can, e.g., improve cycle performance.

In the present disclosure, the use of chemical compounds comprising functional boron-containing chemicals (compounds) as cathode additives to improve the cycle performance of Si anode-based Li-ion full cells is described. Functional boron-containing chemicals may be added directly to electrode slurries, such as a cathode slurry to prepare additive-containing cathodes including, but not limited to, those listed above. Functional boron-containing compounds are also described herein as cathode additives to improve the cycle performance of graphite anode-based Li-ion full cells or other anode-based Li-ion full cells. The functional boron-containing chemicals may be used as cathode additives in different types of cathode-based (such as Ni-rich NCA or NCM, Li-rich, $xLi_2MnO_3 \cdot (1-x)LiNi_aCo_bMn_cO_2$, Li-rich layered oxides, high-voltage spinel oxides, etc.) Li-ion full cells.

Functional boron-containing compounds are used as cathode additives without negative impacts on the anode, electrolyte, and the battery manufacture procedures or design. Using functional boron-containing chemicals as cathode additives may be an efficient, cost-effective and feasible strategy to overcome the barriers of layered cathode materials and to improve the full cell performance. The cathode-electrolyte interphase layer thus generated may effectively mitigate electrolyte decomposition and the dissolution of transition metal components, thereby improving the interfacial stability of cathodes.

In the present disclosure, the use of chemical compounds comprising functional boron-containing chemicals as anode additives to improve the cycle performance of Si anode-based Li-ion full cells with different cathodes is described. Si anodes include directly coated Si-dominant anodes with or without further thermal treatments, laminated Si-dominant anodes, and all other Si anodes. Functional boron-containing chemicals may be added directly to electrode slurries, such as an anode slurry to prepare additive-containing anodes. In some embodiments, the functional boron-containing chemicals may be used as Si anode additives by directly adding them into the Si anode slurry to prepare additive-containing direct-coated Si-dominant anodes (with or without further thermal treatment at high temperature) or laminated Si-dominant anodes after pyrolysis. In some embodiments, electrode additives may comprise 5% or less by weight of the active material of the electrode; in other embodiments, electrode additives may comprise 1% or less by weight of the active material of the electrode.

In the present disclosure, the use of functional boron-containing chemicals as additives in electrolyte compositions to improve the cycle performance of different types of Li-ion batteries or Li-metal batteries is also described.

In the present disclosure, the use of functional boron-containing chemicals to modify the separator to prepare different types of functional separators to improve the cycle performance of Li-ion batteries or Li-metal batteries is also described.

The term "alkyl" refers to a straight or branched, saturated, aliphatic radical having the number of carbon atoms indicated. The alkyl moiety may be branched or straight chain. For example, C1-C6 alkyl includes, but is not limited to, methyl, ethyl, propyl, isopropyl, butyl, isobutyl, sec-butyl, tert-butyl, pentyl, isopentyl, hexyl, etc. Other alkyl groups include, but are not limited to heptyl, octyl, nonyl, decyl, etc. Alkyl can include any number of carbons, such as 1-2, 1-3, 1-4, 1-5, 1-6, 1-7, 1-8, 1-9, 1-10, 1-11, 1-12 2-3, 2-4, 2-5, 2-6, 3-4, 3-5, 3-6, 4-5, 4-6 and 5-6. The alkyl group is typically monovalent, but can be divalent, such as when the alkyl group links two moieties together.

The term "fluoro-alkyl" refers to an alkyl group where one, some, or all hydrogen atoms have been replaced by fluorine.

The term "alkylene" refers to an alkyl group, as defined above, linking at least two other groups, i.e., a divalent hydrocarbon radical. The two moieties linked to the alkylene can be linked to the same atom or different atoms of the alkylene. For instance, a straight chain alkylene can be the bivalent radical of $-(CH_2)_n-$, where n is 1, 2, 3, 4, 5, 6, 7, 8, 9, or 10. Alkylene groups include, but are not limited to, methylene, ethylene, propylene, isopropylene, butylene, isobutylene, sec-butylene, pentylene and hexylene.

The term "alkoxy" refers to alkyl group having an oxygen atom that either connects the alkoxy group to the point of attachment or is linked to two carbons of the alkoxy group. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. For example, the alkoxy groups can be substituted with halogens to form a "halo-alkoxy" group, or substituted with fluorine to form a "fluoro-alkoxy" group.

The term "alkenyl" refers to either a straight chain or branched hydrocarbon of 2 to 6 carbon atoms, having at least one double bond. Examples of alkenyl groups include, but are not limited to, vinyl, propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can also have from 2 to 3, 2 to 4, 2 to 5, 3 to 4, 3 to 5, 3 to 6, 4 to 5, 4 to 6 and 5 to 6 carbons. The alkenyl group is typically monovalent, but can be divalent, such as when the alkenyl group links two moieties together.

The term "alkenylene" refers to an alkenyl group, as defined above, linking at least two other groups, i.e., a divalent hydrocarbon radical. The two moieties linked to the alkenylene can be linked to the same atom or different atoms of the alkenylene. Alkenylene groups include, but are not limited to, ethenylene, propenylene, isopropenylene, butenylene, isobutenylene, sec-butenylene, pentenylene and hexenylene.

The term "alkynyl" refers to either a straight chain or branched hydrocarbon of 2 to 6 carbon atoms, having at least one triple bond. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. Alkynyl groups can also have from 2 to 3, 2 to 4, 2 to 5, 3 to 4, 3 to 5, 3 to 6, 4 to 5, 4 to 6 and 5 to 6 carbons. The alkynyl group is typically monovalent, but can be divalent, such as when the alkynyl group links two moieties together.

The term "alkynylene" refers to an alkynyl group, as defined above, linking at least two other groups, i.e., a divalent hydrocarbon radical. The two moieties linked to the alkynylene can be linked to the same atom or different atoms of the alkynylene. Alkynylene groups include, but are not limited to, ethynylene, propynylene, butynylene, sec-butynylene, pentynylene and hexynylene.

The term "cycloalkyl" refers to a saturated or partially unsaturated, monocyclic, fused bicyclic, bridged polycyclic, or spiro ring assembly containing from 3 to 12, from 3 to 10, or from 3 to 7 ring atoms, or the number of atoms indicated. Monocyclic rings include, for example, cyclopropyl, cyclobutyl, cyclopentyl, cyclohexyl, and cyclooctyl. Bicyclic and polycyclic rings include, for example, norbornane, decahydronaphthalene and adamantane. For example, C3-C8 cycloalkyl includes cyclopropyl, cyclobutyl, cyclopentyl, cyclohexyl, cyclooctyl, and norbornane. As used herein, the term "fused" refers to two rings which have two atoms and one bond in common. For example, in the following structure, rings A and B are fused

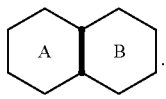

As used herein, the term "bridged polycyclic" refers to compounds wherein the cycloalkyl contains a linkage of one or more atoms connecting non-adjacent atoms. The following structures

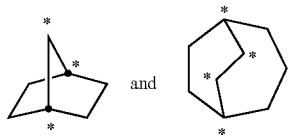 [SMILES: C1C[C@H]2CC[C@H]1C2 ; C1CC2CCC(C1)CC2]

are examples of "bridged" rings. As used herein, the term "spiro" refers to two rings which have one atom in common and the two rings are not linked by a bridge. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, adamantanyl, and norbornanyl; and examples of spiro cycloalkyl groups include spiro[3.3]heptane and spiro[4.5]decane.

The term "cycloalkylene" refers to a cycloalkyl group, as defined above, linking at least two other groups, i.e., a divalent hydrocarbon radical. The two moieties linked to the cycloalkylene can be linked to the same atom or different atoms of the cycloalkylene. Cycloalkylene groups include, but are not limited to, cyclopropylene, cyclobutylene, cyclopentylene, cyclohexylene, and cyclooctylene.

The term "aryl" refers to a monocyclic or fused bicyclic, tricyclic or greater, aromatic ring assembly containing 6 to 16 ring carbon atoms. For example, aryl may be phenyl, benzyl or naphthyl, preferably phenyl. Aryl groups may include fused multicyclic ring assemblies wherein only one ring in the multicyclic ring assembly is aromatic. Aryl groups can be mono-, di- or tri-substituted by one, two or three radicals. Preferred as aryl is naphthyl, phenyl or phenyl mono- or disubstituted by alkoxy, phenyl, halogen, alkyl or trifluoromethyl, especially phenyl or phenyl-mono- or disubstituted by alkoxy, halogen or trifluoromethyl, and in particular phenyl.

The term "arylene" refers to an aryl group, as defined above, linking at least two other groups. The two moieties linked to the arylene are linked to different atoms of the arylene. Arylene groups include, but are not limited to, phenylene.

The term "heteroaryl" refers to a monocyclic or fused bicyclic or tricyclic aromatic ring assembly containing 5 to 16 ring atoms, where from 1 to 4 of the ring atoms are a heteroatom each N, O or S. For example, heteroaryl includes pyridyl, indolyl, indazolyl, quinoxalinyl, quinolinyl, isoquinolinyl, benzothienyl, benzofuranyl, furanyl, pyrrolyl, thiazolyl, benzothiazolyl, oxazolyl, isoxazolyl, triazolyl, tetrazolyl, pyrazolyl, imidazolyl, thienyl, or any other radicals substituted, especially mono- or di-substituted, by e.g. alkyl, nitro or halogen. Pyridyl represents 2-, 3- or 4-pyridyl, advantageously 2- or 3-pyridyl. Thienyl represents 2- or 3-thienyl. Quinolinyl represents preferably 2-, 3- or 4-quinolinyl. Isoquinolinyl represents preferably 1-, 3- or 4-isoquinolinyl. Benzopyranyl, benzothiopyranyl represents preferably 3-benzopyranyl or 3-benzothiopyranyl, respectively. Thiazolyl represents preferably 2- or 4-thiazolyl, and most preferred 4-thiazolyl. Triazolyl is preferably 1-, 2- or 5-(1,2,4-triazolyl). Tetrazolyl is preferably 5-tetrazolyl.

Preferably, heteroaryl is pyridyl, indolyl, quinolinyl, pyrrolyl, thiazolyl, isoxazolyl, triazolyl, tetrazolyl, pyrazolyl, imidazolyl, thienyl, furanyl, benzothiazolyl, benzofuranyl, isoquinolinyl, benzothienyl, oxazolyl, indazolyl, or any of the radicals substituted, especially mono- or di-substituted.

The term "heteroalkyl" refers to an alkyl group having from 1 to 3 heteroatoms such as N, O and S. The heteroatoms can also be oxidized, such as, but not limited to, —S(O)— and —S(O)$_2$—. For example, heteroalkyl can include ethers, thioethers, alkyl-amines and alkyl-thiols.

The term "heteroalkylene" refers to a heteroalkyl group, as defined above, linking at least two other groups. The two moieties linked to the heteroalkylene can be linked to the same atom or different atoms of the heteroalkylene.

The term "heterocycloalkyl" refers to a ring system having from 3 ring members to about 20 ring members and from 1 to about 5 heteroatoms such as N, O and S. The heteroatoms can also be oxidized, such as, but not limited to, —S(O)— and —S(O)$_2$—. For example, heterocycle includes, but is not limited to, tetrahydrofuranyl, tetrahydrothiophenyl, morpholino, pyrrolidinyl, pyrrolinyl, imidazolidinyl, imidazolinyl, pyrazolidinyl, pyrazolinyl, piperazinyl, piperidinyl, indolinyl, quinuclidinyl and 1,4-dioxa-8-aza-spiro[4.5]dec-8-yl.

The term "heterocycloalkylene" refers to a heterocyclalkyl group, as defined above, linking at least two other groups. The two moieties linked to the heterocycloalkylene can be linked to the same atom or different atoms of the heterocycloalkylene.

The term "optionally substituted" is used herein to indicate a moiety that can be unsubstituted or substituted by one or more substituent. When a moiety term is used without specifically indicating as substituted, the moiety is unsubstituted.

To overcome the current obstacles associated with developing high-energy full-cells with Si-based anodes, the next generation of oxidation-stable electrolytes or electrolyte additives are developed. The electrolyte or electrolyte additives can form a stable, electronically insulating but ionically conducting SEI layer on the surface of Si anodes. Additionally, these electrolytes or additives may also help modify cathode surfaces, forming stable CEI layers. These could enable the electrochemical stability of Li-ion batteries when cycled at higher voltages and help with calendar life of the batteries. In addition, to alleviate battery safety concerns, these additives may impart an increased thermal stability to the organic components of the electrolyte, drive a rise in the flash point of the electrolyte formulations, increase the flame-retardant effectiveness and enhance thermal stability of SEI or CEI layers on the surface of electrodes. Further, the additives may produce one or more of the following benefits: increased energy density, increased safety, decreased electrolyte consumption and/or decreased gassing.

In the present disclosure, the use of chemical compounds comprising functional boron-containing chemicals electrolyte additives in electrolyte compositions for energy storage devices is described. Due to their unique chemical structures and functional groups, using functional boron-containing chemicals as electrolyte additives may bring the following benefits: (i) stabilize solid/electrolyte interface film to reduce electrolyte reactions (oxidation on the NCM, NCA, or LCO cathode and reduction on the Si anode), prevent Si anode volume expansion, and protect transition metal ion dissolution from NCM or NCA cathodes and stabilize the subsequent structure changes; and avoid the exothermic reaction between the released oxygen from cathodes and an organic electrolyte and enhance the thermal stability of cathodes; and (ii) reduce the flammability and enhance the thermal stability of organic electrolytes and increase the safety of electrolyte solutions. Due to their versatility in reaction chemistry and overall stability in electrochemical environments, involving functional boron-containing chemicals as electrolyte additives into electrolyte compositions may help improve both overall electrochemical performance and safety of Si anode-based Li-ion batteries.

Typical carbon anode electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would likely be unable to mechanically support itself. Therefore, conventional electrodes require a support structure such as the collector to be able to function as an electrode. The electrode (e.g., anode or cathode) compositions described in this application can produce electrodes that are self-supported. The need for a metal foil current collector is eliminated or minimized because conductive carbonized polymer is used for current collection in the anode structure as well as for mechanical support. In typical applications for the mobile industry, a metal current collector is typically added to ensure sufficient rate performance. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

Anode electrodes (negative electrodes) currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of up to 4200 mAh/g. In order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, have also been reported as viable candidates as active materials for the negative or positive electrodes. Small particle sizes (for example, sizes in the nanometer range) generally can increase cycle life performance. They also can display very high initial irreversible capacity. However, small particle sizes also can result in very low volumetric energy density (for example, for the overall cell stack) due to the difficulty of packing the active material. Larger particle sizes, (for example, sizes in the micron range) generally can result in higher density anode material. However, the expansion of the silicon active material can result in poor cycle life due to particle cracking. For example, silicon can swell in excess of 300% upon lithium insertion. Because of this expansion, anodes including silicon should be allowed to expand while maintaining electrical contact between the silicon particles.

In the present disclosure, the use of chemical compounds comprising functional boron-containing chemicals as electrode additives for Si anodes-based Li-ion batteries is described. In some embodiments, the functional boron-containing chemicals may be used as Si anode additives by directly adding them into the Si anode slurry to prepare the anode (with or without further thermal treatment at high temperature) or as laminated Si-dominant anodes after pyrolysis. The Si anodes may be Si-dominant anodes, directly coated Si-dominant anodes, or coated Si anodes with polymer binder and carbon black. The use of functional boron-containing chemicals as anode additives may result in advantages such as increased cycle life, increased safety and/or decreased electrolyte consumption.

Cathode electrodes (positive electrodes) described herein may include metal oxide cathode materials, such as Lithium Manganese Oxide (LMO), Lithium Iron Phosphate (LFP), Lithium Cobalt Oxide ($LiCoO_2$) (LCO), Ni-rich oxides, high voltage cathode materials, lithium-rich oxides, nickel-rich layered oxides, lithium rich layered oxides, high-voltage spinel oxides, and high-voltage polyanionic compounds. Ni-rich oxides and/or high voltage cathode materials may include NCM and NCA. One example of a NCM material includes $LiNi_{0.6}Co_{0.2}Mn_{0.2}O_2$ (NCM-622). Lithium rich oxides may include $xLi_2Mn_3O_2 \cdot (1-x)LiNi_aCo_bMn_cO_2$. Nickel-rich layered oxides may include $LiNi_{1+x}M_{1-x}O_z$ (where M=Co, Mn or Al). Lithium rich layered oxides may include $LiNi_{1+x}M_{1-x}O_2$ (where M=Co, Mn or Ni). High-voltage spinel oxides may include $LiNi_{0.6}Mn_{1.5}O_4$. High-voltage polyanionic compounds may include phosphates, sulfates, silicates, etc.

In certain embodiments, the positive electrode may be one of NCA, NCM, LMO or LCO. NCM cathodes include, but are not limited to, NCM 9 0.5 0.5, NCM811, NCM622, NCM532, NCM433, NCM111, and others. In further embodiments, the positive electrode comprises a lithium-rich layered oxide $xLi_2MnO_3 \cdot (1-x)LiNi_aCo_bMn_cO_2$; nickel-rich layered oxide $LiNi_{1-x}M_xO_2$ (M=Co, Mn and Al); or lithium rich layered oxide $LiNi_{1+x}M_{1-x}O_2$ (M=Co, Mn and Ni) cathode.

Materials such as Ni-rich NCM or NCA are promising cathode materials for high energy density Li-ion batteries because of their high capacity and low cost. Unfortunately, charging the NCM or NCA cathode to high potentials not only triggers oxygen evolution but also causes oxidative decomposition of the electrolyte solvents which finally lead to serious capacity degradation. Strategies to overcome these problems include cationic doping for stabilizing lattice structure, surface coating for protecting particles from reacting with the electrolyte components, synthesizing concentration-gradient, core-shell materials with high Ni content core, or using electrolyte additives. The surface modification of a cathode active material may affect battery performance because the electrochemical reaction takes place at the interface of the electrochemically active materials and the electrolyte. The protective effects of these surface coatings are typically attributed to the scavenging of HF, limiting transition metal dissolution, altering the composition of the solid electrolyte interface on the positive electrode, and the physical blockage of electrolyte components from reaching the electroactive material surface. However, all these treatments require additional precipitating (or washing) and heating processes, leading to an increase in the cost of battery manufacture.

In the present disclosure, the use of functional boron-containing chemicals as cathode additives for different types of cathode-based Li-ion full cells is described. A simplified process is described where functional boron-containing chemicals are dispersed directly into a cathode-coating slurry to prepare functional boron chemical-containing cathodes. Functional boron-containing chemicals may be added directly to electrode slurries, such as a cathode slurry to prepare additive-containing cathodes including, but not limited to, those listed above. These chemicals may help modify the cathode electrolyte interphase (CEI) layer composition and may improve the CEI stability on the surface of cathodes or cathode powders, which may permit effective surface passivation of the cathode, increase CEI robustness and increase structural stability of the cathodes. In addition, these electrode additives may help effectively mitigate electrolyte decomposition and the dissolution of transition metal components, thereby improving the interfacial stability of cathodes. The use of functional boron-containing chemicals as cathode additives may result in advantages such as increased cycle life, increased safety and/or decreased electrolyte consumption.

As described herein and in U.S. patent application Ser. Nos. 13/008,800 and 13/601,976, entitled "Composite Materials for Electrochemical Storage" and "Silicon Particles for Battery Electrodes," respectively, certain embodiments utilize a method of creating monolithic, self-supported anodes using a carbonized polymer. Because the polymer is converted into an electrically conductive and electrochemically active matrix, the resulting electrode is conductive enough that, in some embodiments, a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 1200 mAh/g that can be due to, for example, 1) the use of silicon, 2) elimination or substantial reduction of metal current collectors, and 3) being comprised entirely or substantially entirely of active material.

As described herein and in U.S. patent application Ser. No. 14/800,380, entitled "Electrolyte Compositions for Batteries," the entirety of which is hereby incorporated by reference, composite materials can be used as an anode in most conventional Li-ion batteries; they may also be used as the cathode in some electrochemical couples with additional additives. The composite materials can also be used in either secondary batteries (e.g., rechargeable) or primary batteries (e.g., non-rechargeable). In some embodiments, the composite materials can be used in batteries implemented as a pouch cell, as described in further details herein. In certain embodiments, the composite materials are self-supported structures. In further embodiments, the composite materials are self-supported monolithic structures. For example, a collector may be included in the electrode comprised of the composite material. In certain embodiments, the composite material can be used to form carbon structures discussed in U.S. patent application Ser. No. 12/838,368 entitled "Carbon Electrode Structures for Batteries," the entirety of which is hereby incorporated by reference. Furthermore, the composite materials described herein can be, for example, silicon composite materials, carbon composite materials, and/or silicon-carbon composite materials.

In some embodiments, a largest dimension of the silicon particles can be less than about 40 µm, less than about 1 µm, between about 10 nm and about 40 µm, between about 10 nm and about 1 µm, less than about 500 nm, less than about 100 nm, and about 100 nm. All, substantially all, or at least some of the silicon particles may comprise the largest dimension described above. For example, an average or median largest dimension of the silicon particles can be less than about 40 µm, less than about 1 µm, between about 10 nm and about 40 µm, between about 10 nm and about 1 µm, less than about 500 nm, less than about 100 nm, and about 100 nm. The amount of silicon in the composite material can be greater than zero percent by weight of the mixture and composite material. In certain embodiments, the mixture comprises an amount of silicon, the amount being within a range of from about 0% to about 95% by weight, including from about 30% to about 95% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight; greater than 0% and less than about 95% by weight; or between about 50% and about 95% by weight. Additional embodiments of the amount of silicon in the composite material include more than about 50% by weight, between about 30% and about 95% by weight, between about 50% and about 85% by weight, and between about 75% and about 95% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size in the micron range and a surface including nanometer-sized features. In some embodiments, the silicon particles have an average particle size (e.g., average diameter or average largest dimension) between about 0.1 µm and about 30 µm or between about 0.1 µm and all values up to about 30 µm. For example, the silicon particles can have an average particle size between about 0.5 µm and about 25 µm, between about 0.5 µm and about 20 µm, between about 0.5 µm and about 15 µm, between about 0.5 µm and about 10 µm, between about 0.5 µm and about 5 µm, between about 0.5 µm and about 2 µm, between about 1 µm and about 20 µm, between about 1 µm and about 15 µm, between about 1 µm and about 10 µm, between about 5 µm and about 20 µm, etc. Thus, the average particle size can be any value between about 0.1 µm and about 30 µm, e.g., 0.1 µm, 0.5 µm, 1 µm, 5 µm, 10 µm, 15 µm, 20 µm, 25 µm, and 30 µm.

The composite material can be formed by pyrolyzing a polymer precursor, such as polyamide acid. The amount of carbon obtained from the precursor can be about 50 weight percent by weight of the composite material. In certain embodiments, the amount of carbon from the precursor in the composite material is about 10% to about 25% by weight. The carbon from the precursor can be hard carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. A soft carbon precursor can be used if it does not melt at the heat treatment temperatures used. In some embodiments, the amount of carbon in the composite material has a value within a range of from about 10% to about 25% by weight, about 20% by weight, or more than about 50% by weight. In certain embodiments, the carbon phase is substantially amorphous. In other embodiments, the carbon phase is substantially crystalline. In further embodiments, the carbon phase includes amorphous and crystalline carbon. In some embodiments, the composite material may contain greater than 0% and less than about 90% by weight of one or more types of carbon phases. The carbon phase can be a matrix phase in the composite material. The carbon can also be embedded in the pores of the additives including silicon. The carbon may react with some of the additives to create some materials at interfaces. For example, there may be a silicon carbide layer between silicon particles and the carbon.

In certain embodiments, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, a largest dimension of the graphite particles is between about 0.5 microns and about 20 microns. All, substantially all, or at least some of the graphite particles may comprise the largest dimension described herein. In further embodiments, an average or median largest dimension of the graphite particles is between about 0.5 microns and about 20 microns. In certain embodiments, the mixture includes greater than 0% and less than about 80% by weight of graphite particles. In further embodiments, the composite material includes about 1% to about 20% by weight graphite particles. In additional embodiments, the composite material includes about 40% to about 75% by weight graphite particles.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a largest dimension of the conductive particles is between about 10 nanometers and about 7 millimeters. All, substantially all, or at least some of the conductive particles may comprise the largest dimension described herein. In further embodiments, an average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys including copper, nickel, or stainless steel.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In some embodiments, the full capacity of the composite material may not be utilized during use of the battery to improve battery life (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to a gravimetric capacity of about 550 to about 850 mAh/g. Although, the maximum gravimetric capacity of the composite material may not be utilized, using the composite material at a lower capacity can still achieve a higher capacity than certain lithium ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 60% of the composite material's maximum gravimetric capacity or below about 50% of the composite material's maximum gravimetric capacity.

An electrolyte composition for a lithium ion battery can include a solvent and a lithium ion source, such as a lithium-containing salt. The composition of the electrolyte may be selected to provide a lithium ion battery with improved performance. In some embodiments, the electrolyte may contain an electrolyte additive. As described herein, a lithium ion battery may include a first electrode, a second electrode, a separator between the first electrode and the second electrode, and an electrolyte in contact with the first electrode, the second electrode, and the separator. The electrolyte serves to facilitate ionic transport between the first electrode and the second electrode. In some embodiments, the first electrode and the second electrode can refer to anode and cathode or cathode and anode, respectively. Electrolytes and/or electrolyte compositions may be a liquid, solid, or gel.

In lithium-ion batteries, the most widely used electrolytes are non-aqueous liquid electrolytes; these may comprise a lithium-containing salt (e.g. LiPF6) and low molecular weight carbonate solvents as well as various small amounts of functional additives. LiPF6 holds a dominant position in commercial liquid electrolytes due to its well-balanced properties. However, LiPF6 has problems such as high reactivity towards moisture and poor thermal stability. These issues are primarily attributed to the equilibrium decomposition reaction of LiPF6. The P—F bond in LiPF6 and PF5 is rather labile towards hydrolysis by inevitable trace amounts of moisture in batteries. Besides, as a strong Lewis acid, PF5 is also able to initiate reactions with carbonate solvents, and causes further electrolyte degradation. Moreover, a rise in temperature further accelerates the decomposition reaction of LiPF6 and consequently promotes subsequent parasitic reactions. This is also a reason for faster aging of current lithium-ion batteries at elevated temperatures, as compared to room temperature.

In some embodiments, the electrolyte for a lithium ion battery may include o solvent comprising a fluorine-containing component, such as a fluorine-containing cyclic carbonate, a fluorine-containing linear carbonate, and/or a fluoroether. In some embodiments, the electrolyte can include more than one solvent. For example, the electrolyte may include two or more co-solvents. In some embodiments, at least one of the co-solvents in the electrolyte is a fluorine-containing compound. In some embodiments, the fluorine-containing compound may be fluoroethylene carbonate (FEC), or difluoroethylene carbonate (F2EC). In some embodiments, the co-solvent may be selected from the group consisting of FEC, ethyl methyl carbonate (EMC), 1,1,2,2-tetrafluoroethyl 2,2,3,3-tetrafluoropropyl ether, difluoroethylene carbonate (F2EC), ethylene carbonate (EC), diethyl carbonate (DEC), dimethyl carbonate (DMC), propylene carbonate (PC), Dimethoxy ethane (DME), and gamma-butyrolactone (GBL), methyl acetate (MA), ethyl acetate (EA), and methyl propanoate. In some embodiments, the electrolyte contains FEC. In some embodiments, the electrolyte contains both EMC and FEC. In some embodiments, the electrolyte may further contain 1,1,2,2-tetrafluoroethyl 2,2,3,3-tetrafluoropropyl ether, EC, DEC, DMC, PC, GBL, and/or F2EC or some partially or fully fluorinated linear or cyclic carbonates, ethers, etc. as a co-solvent. In some embodiments, the electrolyte is free or substantially free of non-fluorine-containing cyclic carbonates, such as EC, GBL, and PC.

In further embodiments, electrolyte solvents may be composed of a cyclic carbonate, such as fluoro ethylene carbonate (FEC), di-fluoroethylene carbonate (DiFEC), Trifluoropropylene carbonate (TFPC), ethylene carbonate (EC), propylene carbonate (PC), etc; a linear carbonate, such as dimethyl carbonate (DMC), diethyl carbonate (DEC), ethyl methyl carbonate (EMC), etc, or other solvents, such as methyl acetate, ethyl acetate, or gamma butyrolactone, dimethoxyethane, 1,1,2,2-tetrafluoroethyl 2,2,3,3-tetrafluoropropyl ether, etc.

In some embodiments, the electrolyte composition may comprise a system of solvents (i.e. a solvent, plus one or more co-solvents). The solvents may be fluorinated or non-fluorinated. In some embodiments, the co-solvents may be one or more linear carbonates, lactones, acetates, propanoates and/or non-linear carbonates. In some embodiments, the co-solvents may be one or more carbonate solvents, such as one or more linear carbonates and/or non-linear carbonates, as discussed above. In some embodiments, an electrolyte composition may comprise one or more of EC at a concentration of 5% or more; FEC at a concentration of 5% or more; and/or TFPC at a concentration of 5% or more.

In some embodiments, the solvents in the electrolyte composition include, but are not limited to, one or more of ethyl methyl carbonate (EMC), methyl acetate, dimethyl carbonate (DMC), diethyl carbonate (DEC), gamma butyrolactone, methyl acetate (MA), ethyl acetate (EA), methyl propanoate, fluoro ethylene carbonate (FEC), di-fluoroethylene carbonate (DiFEC), Trifluoropropylene carbonate (TFPC), ethylene carbonate (EC), vinylene carbonate (VC) or propylene carbonate (PC). In further embodiments, the solvents include at least one of one or more of ethyl methyl carbonate (EMC), methyl acetate, dimethyl carbonate (DMC), diethyl carbonate (DEC), gamma butyrolactone, methyl acetate (MA), ethyl acetate (EA), methyl propanoate, along with at least one or more of fluoro ethylene carbonate (FEC), di-fluoroethylene carbonate (DiFEC), Trifluoropropylene carbonate (TFPC), ethylene carbonate (EC), vinylene carbonate (VC) or propylene carbonate (PC).

As used herein, a co-solvent of an electrolyte has a concentration of at least about 10% by volume (vol %). In some embodiments, a co-solvent of the electrolyte may be about 20 vol %, about 40 vol %, about 60 vol %, or about 80 vol %, or about 90 vol % of the electrolyte. In some embodiments, a co-solvent may have a concentration from about 10 vol % to about 90 vol %, from about 10 vol % to about 80 vol %, from about 10 vol % to about 60 vol %, from about 20 vol % to about 60 vol %, from about 20 vol % to about 50 vol %, from about 30 vol % to about 60 vol %, or from about 30 vol % to about 50 vol %.

For example, in some embodiments, the electrolyte may contain a fluorine-containing cyclic carbonate, such as FEC, at a concentration of about 10 vol % to about 60 vol %, including from about 20 vol % to about 50 vol %, and from about 20 vol % to about 40 vol %. In some embodiments, the electrolyte may comprise a linear carbonate that does not contain fluorine, such as EMC, at a concentration of about 40 vol % to about 90 vol %, including from about 50 vol % to about 80 vol %, and from about 60 vol % to about 80 vol %. In some embodiments, the electrolyte may comprise 1,1,2,2-tetrafluoroethyl 2,2,3,3-tetrafluoropropyl ether at a concentration of from about 10 vol % to about 30 vol %, including from about 10 vol % to about 20 vol %.

In some embodiments, the electrolyte is substantially free of cyclic carbonates other than fluorine-containing cyclic carbonates (i.e., non-fluorine-containing cyclic carbonates). Examples of non-fluorine-containing carbonates include EC, PC, GBL, and vinylene carbonate (VC).

In some embodiments, the electrolyte may further comprise one or more additives. As used herein, an additive of the electrolyte refers to a component that makes up less than 10% by weight (wt %) of the electrolyte. In some embodiments, the amount of each additive in the electrolyte may be from about 0.2 wt % to about 1 wt %, 0.1 wt % to about 2 wt %, 0.2 wt % to about 9 wt %, from about 0.5 wt % to about 9 wt %, from about 1 wt % to about 9 wt %, from about 1 wt % to about 8 wt %, from about 1 wt % to about 8 wt %, from about 1 wt % to about 7 wt %, from about 1 wt % to about 6 wt %, from about 1 wt % to about 5 wt %, from about 2 wt % to about 5 wt %, or any value in between). In some embodiments, the total amount of the additive(s) may be from from about 1 wt % to about 9 wt %, from about 1 wt % to about 8 wt %, from about 1 wt % to about 7 wt %, from about 2 wt % to about 7 wt %, or any value in between. In other embodiments, the percentages of additives may be expressed in volume percent (vol %).

The electrolyte additive may comprise a functional boron-containing chemical. In some embodiments, the electrolyte additive compound may be a functional boron-containing chemical compound derivative, which may be optionally substituted. In some embodiments, the electrolyte may contain the compound as an additive at less than 10 weight %; or at less than 5 weight %.

In accordance with the disclosure, functional boron-containing chemicals may be used as both electrode additives (cathode or anode) and/or as separator modifiers.

In some embodiments, the functional boron-containing chemical compound is selected from one or more of Lithium tetraphenylborate tris(1,2-dimethoxyethane); Vinylboronic anhydride pyridine complex; Lithium Trifluoro(trifluoromethyl)borate-Dimethyl Carbonate Complex; Lithium Tetrakis(pentafluorophenyl)borate-Ethyl Ether Complex; Isopropenylboronic anhydride pyridine complex; Tris(tetrathiafulvalene) Bis(tetrafluoroborate) Complex; Lithium difluoro(oxalato)borate (LiDFOB); Lithium-bis(oxalato)borate (LiBOB); Lithium tetrafluoroborate (LiBF4); Lithium trifluoro(perfluoro-tert-butyloxyl)borate; Lithium pentafluoroethyl trifluoroborate; Lithium tetrakis(p-fluorophenyl)borate(1-); Lithium tetraborate; Lithium tetra(2-methyl-8-hydroxyquinolinato)boron; Vinylboronic acid MIDA ester (CAS: 1104636-73-8); Isopropenylboronic acid MIDA ester (CAS 1104637-47-9); Cyclopropylboronic acid MIDA ester (CAS 1104637-36-6); 2-cyclobutyl-6-methyl-1,3,6,2-dioxazaborocane-4,8-dione (CAS: 1104637-37-7); 2-cyclopentyl-6-methyl-1,3,6,2-dioxazaborocane-4,8-dione (CAS:117311-84-9); 2-cyclohexyl-6-methyl-1,3,6,2-dioxazaborocane-4,8-dione (CAS: 1104637-39-9); 2-ethynyl-6-methyl-1,3,6,2-dioxazaborocane-4,8-dione (CAS: 1104637-53-7); 2-butyl-6-methyl-1,3,6,2-dioxazaborocane-4,8-dione (CAS: 1104637-43-5); Trivinylboroxin (CAS: 92988-08-4); Phenylboronic acid; Trimethylboroxine; Trimethoxyboroxine; Thiophene-2-boronic acid pinacol ester; 4-Methylthiophene-3-boronic acid pinacol ester; 3-(5,5-Dimethyl-1,3,2-dioxaborinan-2-yl)pyridine; 3-Cyano-1-propylboronic acid pinacol ester; Allylboronic acid pinacol ester; 2-Vinyl-4,4,5,5-tetramethyl-1,3,2-dioxaborolane; 2-lsopropenyl-4,4,5,5-tetramethyl-1,3,2-dioxaborolane; Cyclopropylboronic acid pinacol ester; Cyclohexylboronic acid pinacol ester; Pyridine-3-boronic acid 1,3-propanediol ester; 2,5-Difluoropyridine-4-boronic acid, pinacol ester (CAS: 1622217-35-9); or 2,6-Difluoropyridine-3,5-diboronic acid, pinacol ester (CAS: 1218789-90-2).

Example structures of functional boron-containing chemical compounds are shown below:

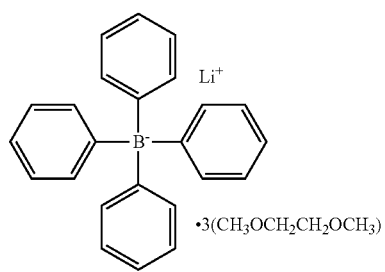

Lithium tetraphenylborate tris(1,2-dimethoxyethane)

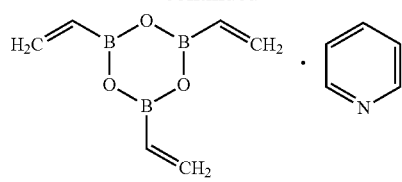

Vinylboronic anhydride pyridine complex

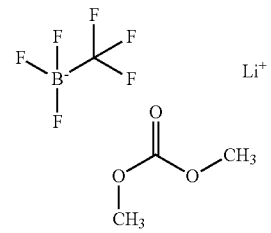

Lithium Trifluoro(trifluoromethyl)borate - Dimethyl Carbonate Complex

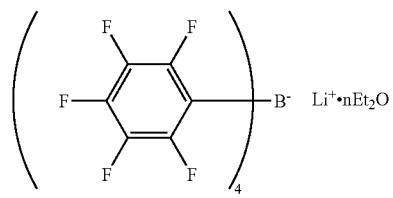

Lithium Tetrakis(pentafluorophenyl)borate - Ethyl Ether Complex

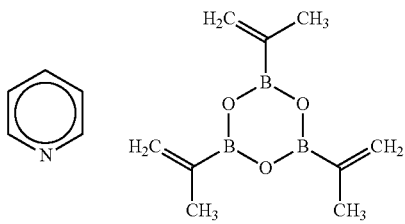

Isopropenylboronic anhydride pyridine complex

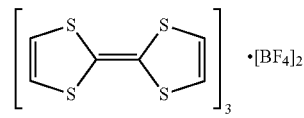

Tris(tetrathiafulvalene) Bis(tetrafluoroborate) Complex

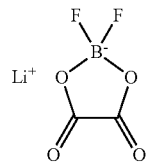

Lithium difluoro(oxalato)borate (LiDFOB)

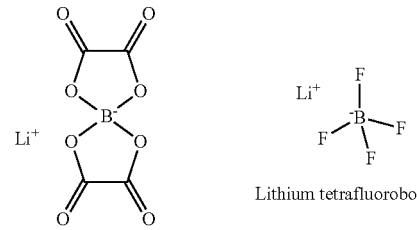

Lithium-bis(oxalato)borate (LiBOB)

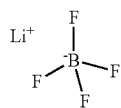

Lithium tetrafluoroborate

-continued

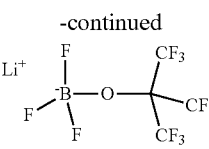

Lithium trifluoro(perfluoro-tert-butyloxyl)borate

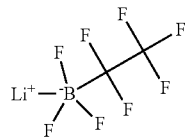

Lithium pentafluoroethyl trifluoroborate

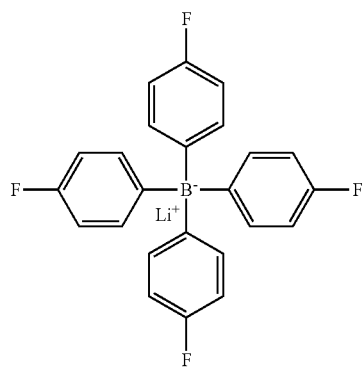

lithium tetrakis(p-fluorophenyl)borate(1-)

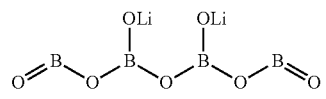

Lithium tetraborate

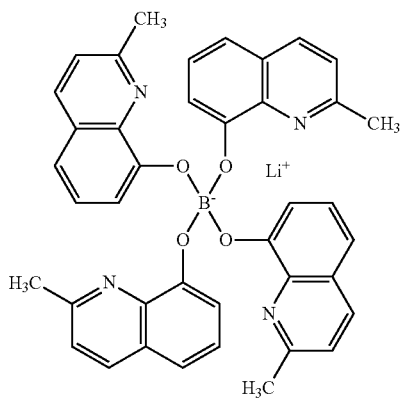

Lithium tetra(2-methyl-8-hydroxyquinolinato)boron

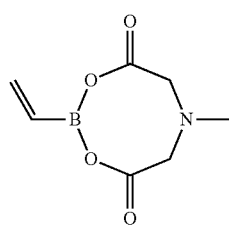

Vinylboronic acid MIDA ester (CAS: 1104636-73-8)

-continued

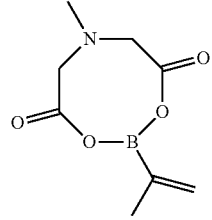

Isopropenylboronic acid MIDA ester (CAS: 1104637-47-9)

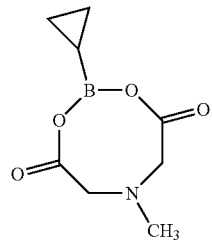

Cyclopropylboronic acid MIDA ester (CAS 1104637-36-6)

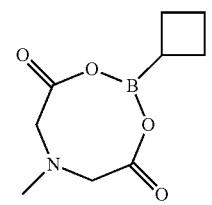

2-cyclobutyl-6-methyl-1,3,6,2-dioxazaborocane-4,8-dione
(CAS: 1104637-37-7)

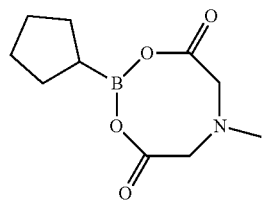

2-cyclopentyl-6-methyl-1,3,6,2-dioxazaborocane-4,8-dione
(CAS: 117311-84-9)

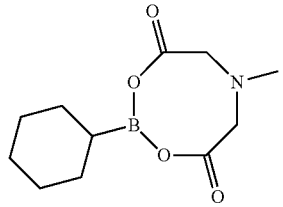

2-cyclohexyl-6-methyl-1,3,6,2-dioxazaborocane-4,8-dione
(CAS: 1104637-39-9)

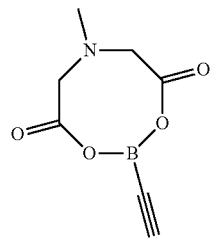

2-ethynyl-6-methyl-1,3,6,2-dioxazaborocane-4,8-dione
(CAS: 1104637-53-7)

-continued

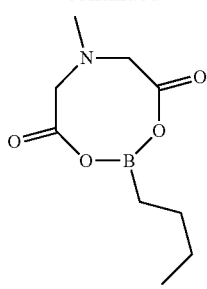

2-butyl-6-methyl-1,3,6,2-dioxazaborocane-4,8-dione
(CAS: 1104637-43-5)

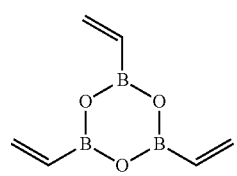

Trivinylboroxin (CAS: 92988-08-4)

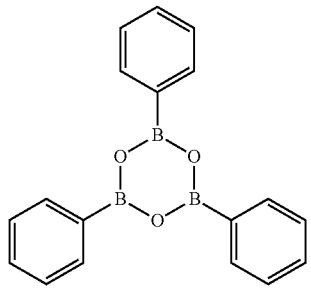

Phenylboronic acid
trimeric anhydride

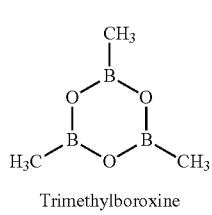

Trimethylboroxine

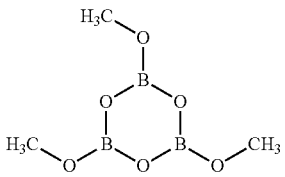

Trimethoxyboroxine

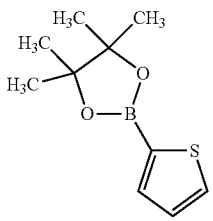

Thiophene-2-boronic acid pinacol ester

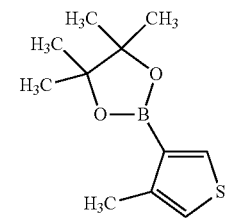

4-Methylthiophene-3-boronic acid pinacol ester

-continued

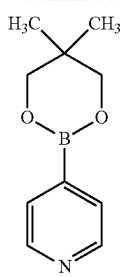

3-(5,5-Dimethyl-1,3,2-dioxaborinan-2-yl)pyridine

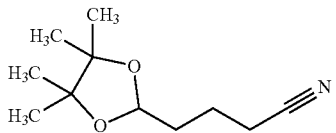

3-Cyano-1-propylboronic acid pinacol ester

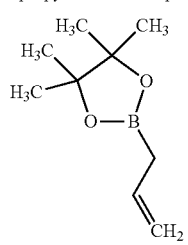

Allylboronic acid pinacol ester

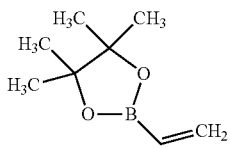

2-Vinyl-4,4,5,5-tetramethyl-1,3,2-dioxaborolane

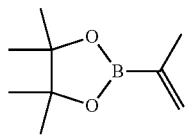

2-Isopropenyl-4,4,5,5-tetramethyl-1,3,2-dioxaborolane

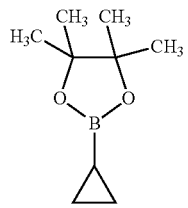

Cyclopropylboronic acid pinacol ester

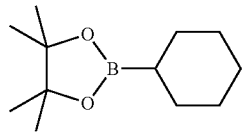

Cyclohexylboronic acid pinacol ester

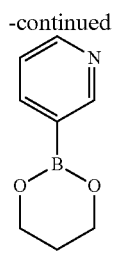

Pyridine-3-boronic acid 1,3-propanediol ester

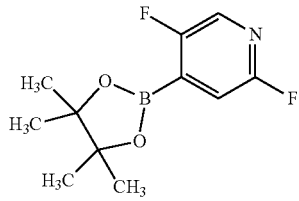

2,5-Difluoropyridine-4-boronic acid, pinacol ester (CAS: 1622217-35-9)

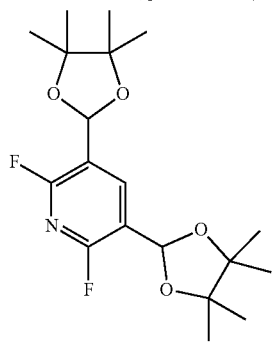

2,6-Difluoropyridine-3,5-diboronic acid,pinacol ester. (CAS: 1218789-90-2)

In some embodiments, the functional boron-containing chemical (compound) may be a boron-containing compound with one or more functional groups, where the functional groups may be H, OH, F, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, alkyl optionally substituted by F, CN, $CF_3$; or a combination thereof. It may also contain other heterogeneous atoms in the structure, such as sulfur, oxygen, Si, P, or others.

Any of the above functional boron-containing chemicals may be used as electrode additives, and/or as additives for electrolyte compositions, and/or as separator modifiers.

In some embodiments, the boron-containing chemical may be an electrode additive and comprises one or more of: Lithium tetraphenylborate tris(1,2-dimethoxyethane); Lithium Trifluoro(trifluoromethyl)borate-Dimethyl Carbonate Complex; Lithium Tetrakis(pentafluorophenyl)borate-Ethyl Ether Complex; Vinylboronic anhydride pyridine complex; Isopropenylboronic anhydride pyridine complex, or Tris(tetrathiafulvalene) Bis(tetrafluoroborate) Complex.

In other embodiments, the boron-containing chemical may be an electrode additive and comprises one or more of: lithium tetrakis(p-fluorophenyl)borate(1-), Lithium tetraborate, Lithium bis(oxalato)borate (LiBOB), Lithium tetra(2-methyl-8-hydroxyquinolinato)boron, Lithium difluoro(oxalato)borate (LiDFOB), LiBF4, lithium trifluoro(perfluoro-tert-butyloxyl)borate; or lithium pentafluoroethyl trifluoroborate.

In additional embodiments, the boron-containing chemical may be an electrode additive and comprises one or more of: Vinylboronic acid MIDA ester (CAS: 1104636-73-8); Isopropenylboronic acid MIDA ester (CAS 1104637-47-9); Cyclopropylboronic acid MIDA ester (CAS 1104637-36-6); 2-cyclobutyl-6-methyl-1,3,6,2-dioxazaborocane-4,8-dione (CAS: 1104637-37-7); 2-cyclopentyl-6-methyl-1,3,6,2-dioxazaborocane-4,8-dione (CAS:117311-84-9); 2-cyclohexyl-6-methyl-1,3,6,2-dioxazaborocane-4,8-dione (CAS: 1104637-39-9); 2-ethynyl-6-methyl-1,3,6,2-dioxazaborocane-4,8-dione (CAS: 1104637-53-7); 2-butyl-6-methyl-1,3,6,2-dioxazaborocane-4,8-dione (CAS: 1104637-43-5); Trivinylboroxin (CAS: 92988-08-4); Phenylboronic acid; Trimethylboroxine; Trimethoxyboroxine; Thiophene-2-boronic acid pinacol ester; 4-Methylthiophene-3-boronic acid pinacol ester; 3-(5,5-Dimethyl-1,3,2-dioxaborinan-2-yl)pyridine; 3-Cyano-1-propylboronic acid pinacol ester; Allylboronic acid pinacol ester; 2-Vinyl-4,4,5,5-tetramethyl-1,3,2-dioxaborolane; 2-lsopropenyl-4,4,5,5-tetramethyl-1,3,2-dioxaborolane; Cyclopropylboronic acid pinacol ester; Cyclohexylboronic acid pinacol ester; Pyridine-3-boronic acid 1,3-propanediol ester; 2,5-Difluoropyridine-4-boronic acid, pinacol estser (CAS: 1622217-35-9); or 2,6-Difluoropyridine-3,5-diboronic acid, pinacol ester (CAS: 1218789-90-2).

The use of functional compound additives is a viable, economical and cost-effective strategy to modify the surface chemistry in batteries. This allows for potential circumvention of the massive volume change and initial capacity loss due to the continuous electrolyte decomposition in high capacity and reactive electrodes, such as Si anodes, Ni-rich NCA or NCM cathodes. Compound additives can be directly added into the cathode slurries, anode (e.g. Si) slurries or used as electrolyte additives. Additives can modify the SEI or CEI interphases in Li-ion batteries, thus altering and tuning their composition and corresponding electrochemical properties, such as cycle life, rate capability, energy/power densities, etc. In the present disclosure, functional boron-containing chemicals are described for use as cathode additives for different types of cathodes, or as electrolyte additives for different Si anode-based Li-ion full cells (which can also be used with the aforementioned cathodes) or as direct anode additives. Functional boron-containing chemicals are also described herein for use as separator modifiers.

Compound additives, as part of electrolyte and/or electrode compositions, can form a SEI layer that can reduce or prevent the cracking and/or the continuous reduction of electrolyte solutions as the silicon containing anode expands and contracts during cycling. Furthermore, these electrolyte additives, along with the electrolyte solvents, may be oxidized on a cathode surface to form a CEI layer that can suppress or minimize further decomposition of the electrolyte on the surface of the cathode. Without being bound to the theory or mode of operation, it is believed that the presence of functional boron-containing chemicals can result in a SEI and/or CEI layer on the surface of electrodes with improved performance. An SEI layer comprising functional boron-containing chemicals may demonstrate improved chemical stability and increased density, for example, compared to SEI layers formed by electrolytes without additives or with traditional additives. As such, the change in thickness and surface reactivity of the interface layer are limited, which may in turn facilitate reduction in capacity fade and/or generation of excessive gaseous byproducts during operation of the lithium ion battery. A CEI layer comprising functional boron-containing chemicals may help minimize transition metal ion dissolution and structure changes on cathode side and may provide favorable kinetics resulting in improved cycling stability and rate capability.

As discussed above, a lithium-ion battery typically includes a separator and/or electrolyte between an anode and a cathode. Separators may be formed as sheets or films, which are then stacked or rolled with the anode and cathode (e.g., electrodes) to form the battery. The separator may comprise a single continuous or substantially continuous sheet or film, which can be interleaved between adjacent electrodes of the electrode stack. The separator may be configured to facilitate electrical insulation between the anode and the cathode, while still permitting ionic transport. In some embodiments, the separator may comprise a porous material. In some embodiments, functional boron-containing chemicals are used to modify the separator to prepare different types of functional separators to improve the cycle performance of Li-ion batteries or Li-metal batteries.

In some embodiments, salts may be included in the electrode or electrolyte compositions. A lithium-containing salt for a lithium ion battery may comprise a fluorinated or non-fluorinated salt. In further embodiments, a lithium-containing salt for a lithium ion battery may comprise one or more of lithium hexafluorophosphate ($LiPF_6$), lithium tetrafluoroborate ($LiBF_4$), lithium hexafluoroarsenate monohydrate ($LiAsF_6$), lithium perchlorate ($LiClO_4$), lithium bis(trifluoromethanesulfonyl)imide (LiTFSI), lithium bis(fluorosulfonyl)imide (LiFSI), lithium bis(oxalato)borate (LiBOB), lithium difluoro(oxalate)borate (LiDFOB), lithium triflate ($LiCF_3SO_3$), lithium tetrafluorooxalato phosphate (LTFOP), lithium difluorophosphate ($LiPO_2F_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB), lithium 2-fluorophenol trimethyl borate (LFPTB), lithium catechol dimethyl borate (LiCDMB), lithium tetrafluorooxalatophosphate (LiFOP), etc. or combinations thereof. In certain embodiments, a lithium-containing salt for a lithium ion battery may comprise lithium hexafluorophosphate (LiPF6). In some embodiments, the electrolyte can have a salt concentration of about 1 moles/L (M). In other embodiments, the salt concentration can be higher than 1 M; in further embodiments, the salt concentration can be higher than 1.2M.

In some embodiments, a lithium ion battery comprising an electrolyte composition according to one or more embodiments described herein, and an anode having a composite electrode film according to one or more embodiments described herein, may demonstrate reduced gassing and/or swelling at about room temperature (e.g., about 20° C. to about 25° C.) or elevated temperatures (e.g., up to temperatures of about 85° C.), increased cycle life at about room temperature or elevated temperatures, and/or reduced cell growth/electrolyte consumption per cycle, for example compared to lithium ion batteries comprising conventionally available electrolyte compositions in combination with an anode having a composite electrode film according to one or more embodiments described herein. In some embodiments, a lithium ion battery comprising an electrolyte composition according to one or more embodiments described herein and an anode having a composite electrode film according to one or more embodiments described herein may demonstrate reduced gassing and/or swelling across various temperatures at which the battery may be subject to testing, such as temperatures between about −20° C. and about 130° C. (e.g., compared to lithium ion batteries comprising conventionally available electrolyte compositions in combination with an anode having a composite electrode film according to one or more embodiments described herein).

Gaseous byproducts may be undesirably generated during battery operation, for example, due to chemical reactions between the electrolyte and one or more other components of the lithium ion battery, such as one or more components of a battery electrode. Excessive gas generation during operation of the lithium ion battery may adversely affect battery performance and/or result in mechanical and/or electrical failure of the battery. For example, undesired chemical reactions between an electrolyte and one or more components of an anode may result in gas generation at levels which can mechanically (e.g., structural deformation) and/or electrochemically degrade the battery. In some embodiments, the composition of the anode and the composition of the electrolyte can be selected to facilitate desired gas generation.

The electrolytes and electrolyte additives described herein may be advantageously utilized within an energy storage device. In some embodiments, energy storage devices may include batteries, capacitors, and battery-capacitor hybrids. In some embodiments, the energy storage device comprise lithium. In some embodiments, the energy storage device may comprise at least one electrode, such as an anode and/or cathode. In some embodiments, at least one electrode may be a Si-based electrode. In some embodiments, the Si-based electrode is a Si-dominant electrode, where silicon is the majority of the active material used in the electrode (e.g., greater than 50% silicon). In some embodiments, the energy storage device comprises a separator. In some embodiments, the separator is between a first electrode and a second electrode.

In some embodiments, the amount of silicon in the electrode material (active material) includes between about 30% and about 95% by weight, between about 50% and about 85% by weight, and between about 75% and about 95% by weight. In other embodiments, the amount of silicon in the electrode material may be at least about 30% by weight; greater than 0% and less than about 95% by weight; or between about 50% and about 95% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

In some embodiments, the energy storage device comprises an electrolyte composition. In some embodiments, the electrolyte composition comprises a solvent, solvent additive and/or additive compound as described herein. For example, in some embodiments, the electrolyte comprises additive compounds comprising a functional boron-containing chemical as described herein.

As described herein, a battery can be implemented as a pouch cell. FIG. 1 shows a cross-sectional schematic diagram of an example of a lithium ion battery 300 implemented as a pouch cell, according to some embodiments. The battery 300 comprises an anode 316 in contact with a negative current collector 308, a cathode 304 in contact with a positive current collector 310, a separator 306 disposed between the anode 316 and the cathode 304. In some embodiments, a plurality of anodes 316 and cathode 304 may be arranged into a stacked configuration with a separator 306 separating each anode 316 and cathode 304. Each negative current collector 308 may have one anode 316 attached to each side; each positive current collector 310 may have one cathode 304 attached to each side. The stacks are immersed in an electrolyte 314 and enclosed in a pouch 312. The anode 302 and the cathode 304 may comprise one or more respective electrode films formed thereon. The number of electrodes of the battery 300 may be selected to provide desired device performance.

With further reference to FIG. 1, the separator 306 may comprise a single continuous or substantially continuous sheet, which can be interleaved between adjacent electrodes of the electrode stack. For example, the separator 306 may be shaped and/or dimensioned such that it can be positioned between adjacent electrodes in the electrode stack to provide desired separation between the adjacent electrodes of the battery 300. The separator 306 may be configured to facilitate electrical insulation between the anode 302 and the cathode 304, while permitting ionic transport between the anode 302 and the cathode 304. In some embodiments, the separator 306 may comprise a porous material, including a porous polyolefin material.

The lithium ion battery 300 may include an electrolyte 314, for example an electrolyte having a composition as described herein. The electrolyte 314 is in contact with the anode 302, the cathode 304, and the separator 306.

With continued reference to FIG. 1, the anode 302, cathode 304 and separator 306 of the lithium ion battery 300 may be enclosed in a housing comprising a pouch 312. In some embodiments, the pouch 312 may comprise a flexible material. For example, the pouch 312 may readily deform upon application of pressure on the pouch 312, including pressure exerted upon the pouch 312 from within the housing. In some embodiments, the pouch 312 may comprise aluminum. For example, the pouch 312 may comprise a laminated aluminum pouch.

In some embodiments, the lithium ion battery 300 may comprise an anode connector (not shown) and a cathode connector (not shown) configured to electrically couple the anodes and the cathodes of the electrode stack to an external circuit, respectively. The anode connector and a cathode connector may be affixed to the pouch 312 to facilitate electrical coupling of the battery 300 to an external circuit. The anode connector and the cathode connector may be affixed to the pouch 312 along one edge of the pouch 312. The anode connector and the cathode connector can be electrically insulated from one another, and from the pouch 312. For example, at least a portion of each of the anode connector and the cathode connector can be within an electrically insulating sleeve such that the connectors can be electrically insulated from one another and from the pouch 312.

Figure 2:
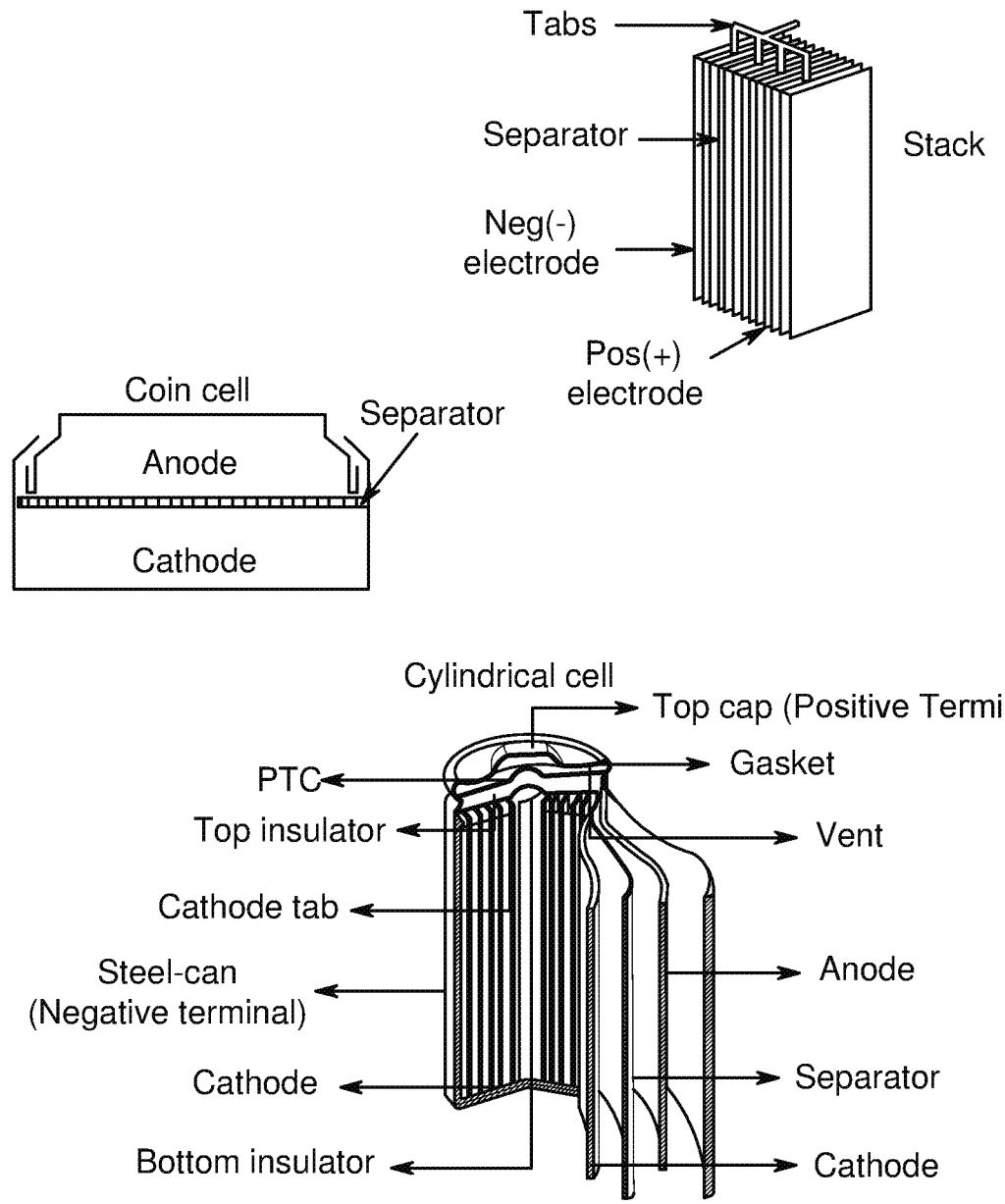
FIG. 2 shows exemplary realistic battery structures, in accordance with an example embodiment of the disclosure.

The cell shown in FIG. 1 is a simplified example to show the principle of operation of a lithium ion cell. Examples of realistic structures are shown in FIG. 2, where stacks of electrodes and separators are utilized, with electrode coatings typically on both sides of the current collectors. The stacks may be formed into different shapes, such as a coin cell, cylindrical cell, or prismatic cell, for example.

Figure 3A:
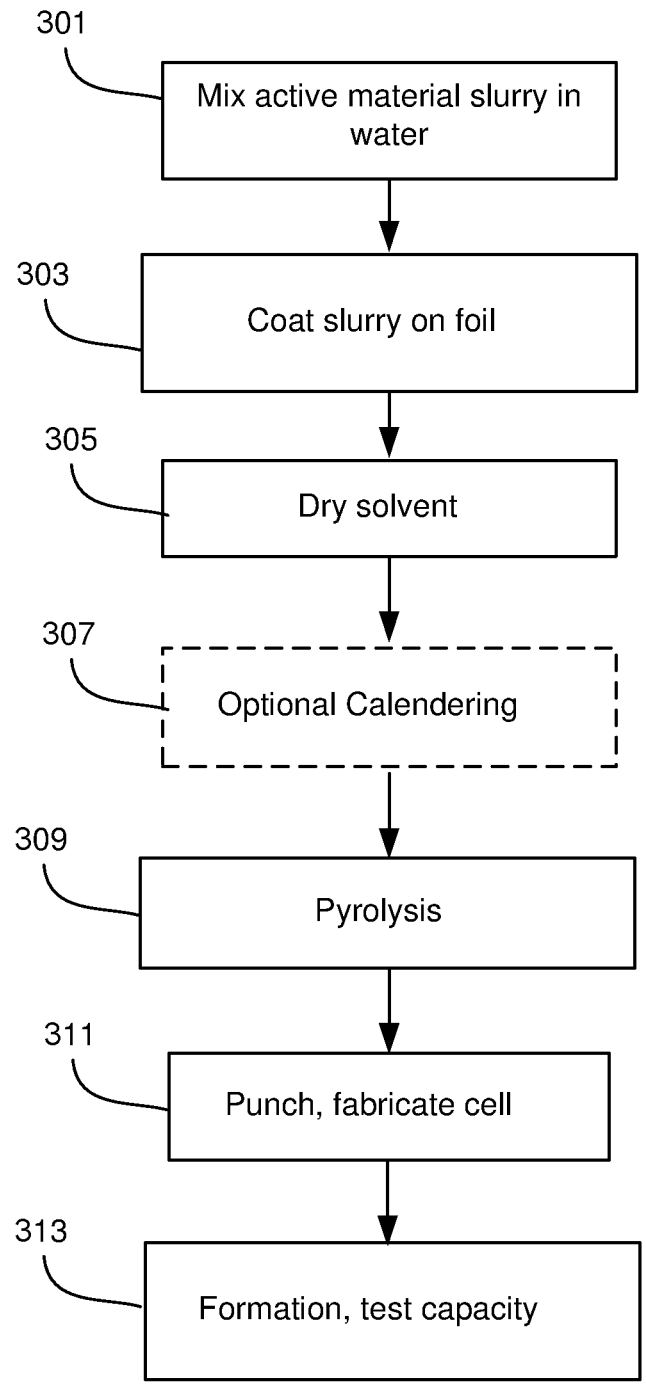
FIGS. 3A and 3B show processes for fabricating cells, in accordance with an example embodiment of the disclosure.

FIG. 3A is a flow diagram of a coating process for fabricating a cell with a silicon-dominant electrode, in accordance with an example embodiment of the disclosure. This process comprises physically mixing the electrode coating layer and additives together to make the active material of the electrode, and then coating it directly on a current collector as opposed to forming the electrode active material on a substrate and then laminating it on a current collector (see FIG. 3B). This strategy may also be adopted by other anode-based cells, such as graphite, conversion type anodes, such as transition metal oxides, transition metal phosphides, and other alloy type anodes, such as Sn, Sb, Al, P, etc. This process may also be used with cathodes.

In step 301, the raw electrode coating layer may be mixed in a slurry comprising electrode materials and an electrolyte composition, which may contain an electrolyte additive.

The particle size (nano to micro) and mixing times may be varied to configure the electrode coating layer density and/or roughness. Furthermore, cathode electrode coating layers may be mixed in step 301, where the electrode coating layer may comprise lithium cobalt oxide (LCO), lithium iron phosphate (LFP), lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In step 303, the as-prepared slurry may be coated on a copper foil, 20 μm thick in this example, and in step 305 may be dried at 130° C. in a convection oven to dry the coating and form the green anode. Similarly, cathode electrode coating layers may be coated on a foil material, such as aluminum, for example.

An optional calendering process may be utilized in step 307 where a series of hard pressure rollers may be used to finish the film/substrate into a smoother and denser sheet of material.

In step 309, the electrode coating layer may be pyrolyzed by heating to 500-800° C., 650° C. in this example, in an inert atmosphere such that carbon precursors are partially or completely converted into conductive carbon. The pyrolysis step may result in an anode electrode coating layer having silicon content greater than or equal to 50% by weight, where the anode has been subjected to heating at or above 400 degrees Celsius.

Pyrolysis can be done either in roll form or after punching in step 311. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In step 313, the cell may be subjected to a formation process, comprising initial charge and discharge steps to lithiate the anode, with some residual lithium remaining, and the cell capacity may be assessed. The fabricated anode shows superior adhesion to copper, a remarkable cohesion, and exceptional flexibility. This anode is shown to be capable of fast charging and performs similar or better than current anodes.

Figure 3B:
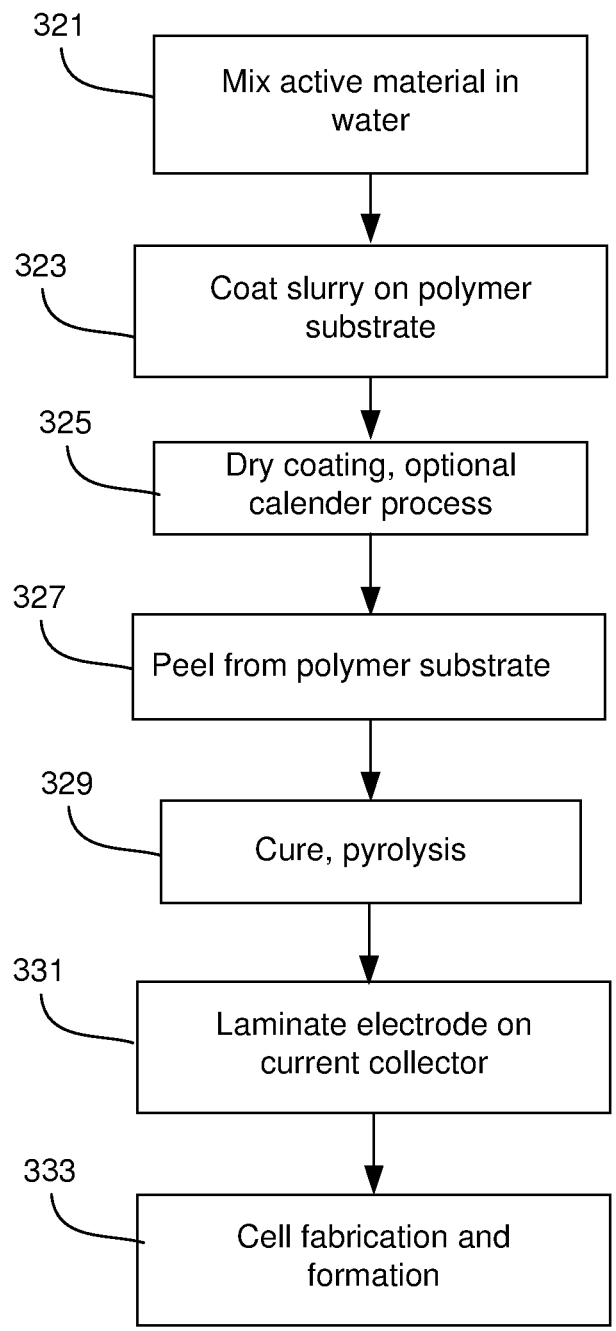
Figure 4A:
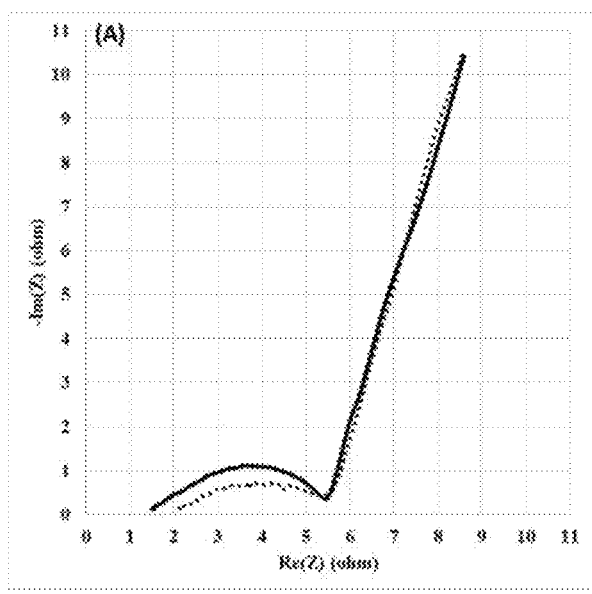
Figure 4B:
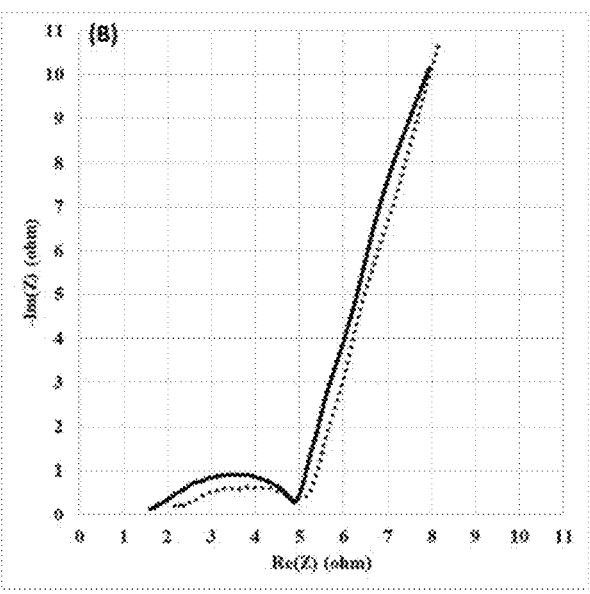
Figure 4E:
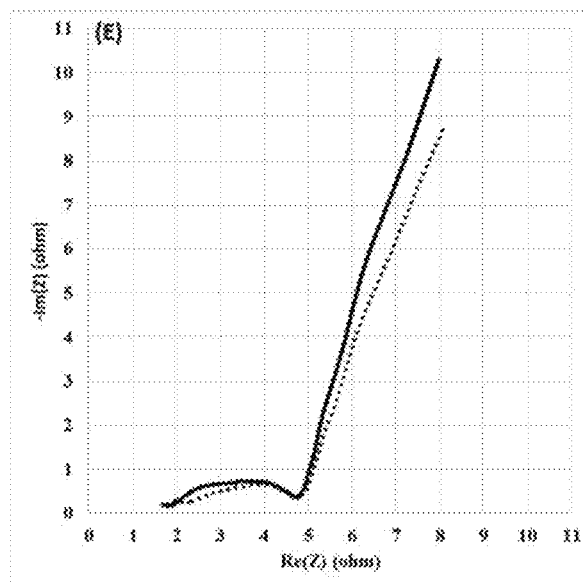
Figure 4F:
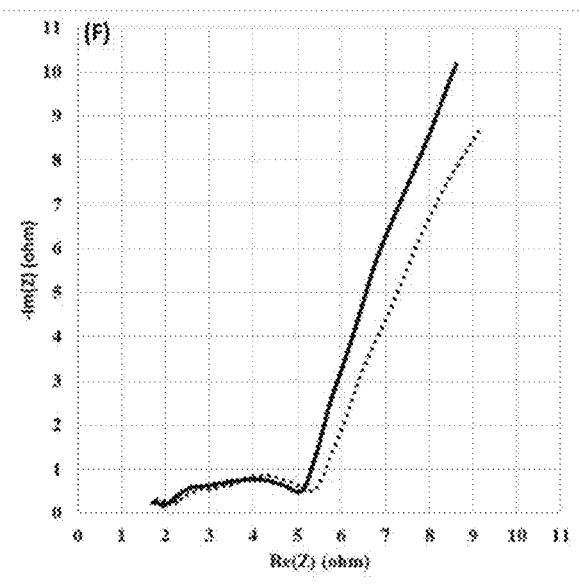
Figures 4G, 4H:
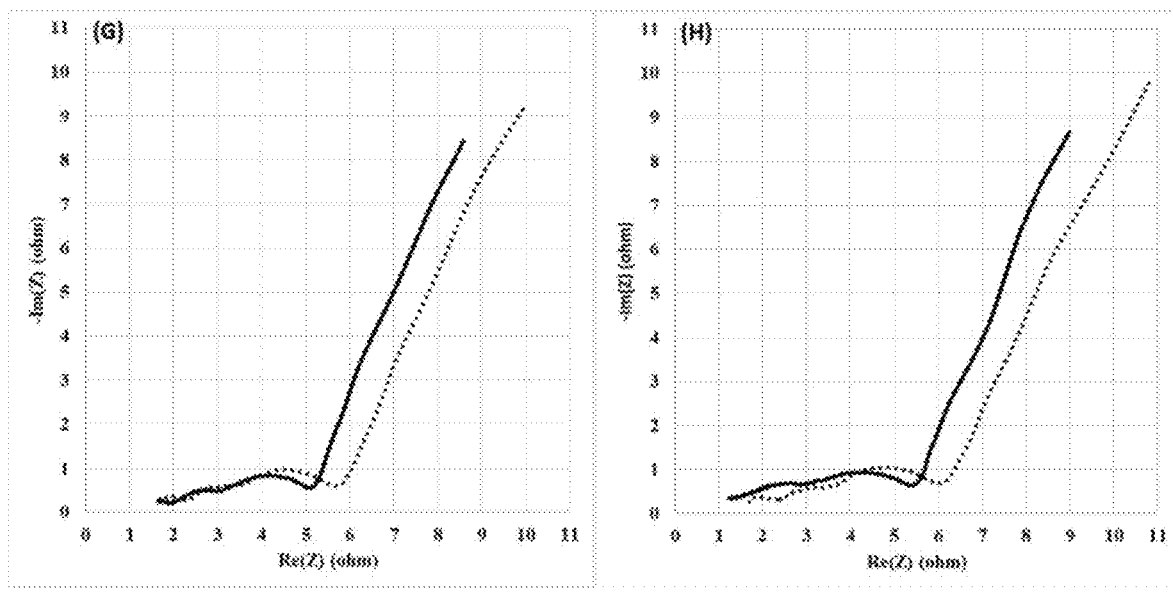
Figure 4I:
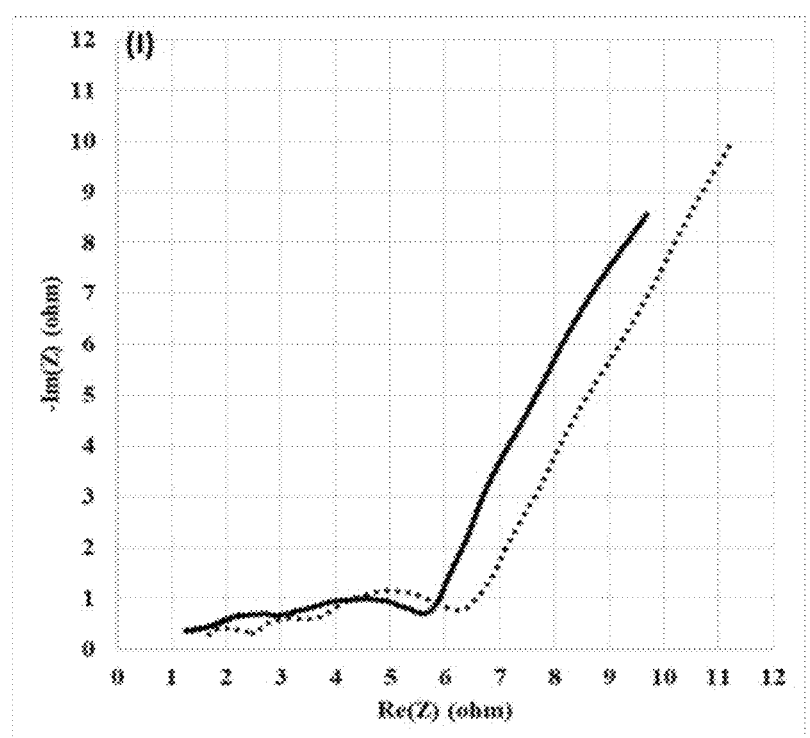

FIG. 3B is a flow diagram of an alternative process for lamination of electrodes, in accordance with an example embodiment of the disclosure. While the previous process to fabricate composite anodes employs a direct coating process, this process physically mixes the active material, conductive additive if desired, and binder together coupled with peeling and lamination processes.

This process is shown in the flow diagram of FIG. 3B, starting with step 321 where the raw electrode coating layer may be mixed in a slurry comprising electrode materials (including any additives) and an electrolyte composition, which may contain an electrolyte additive.

The particle size and mixing times may be varied to configure the electrode coating layer density and/or roughness. Furthermore, cathode electrode coating layers may be mixed in step 321, where the electrode coating layer may comprise lithium cobalt oxide (LCO), lithium iron phosphate (LFP), lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In step 323, the slurry may be coated on a polymer substrate, such as polyethylene terephthalate (PET), polypropylene (PP), or Mylar. The slurry may be coated on the PET/PP/Mylar film at a loading of 3-6 mg/cm$^2$ for the anode and 15-35 mg/cm$^2$ (in some embodiments 20-30 mg/cm$^2$) for the cathode, and then dried in step 325. An optional calendering process may be utilized where a series of hard pressure rollers may be used to finish the film/substrate into a smoothed and denser sheet of material.

In step 327, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 329 where the film may be cut into sheets, and vacuum dried using a two-stage process (100-140° C. for 14-16 hours, 200-240° C. for 4-6 hours). The dry film may be thermally treated at 1000-1300° C. to convert the polymer matrix into carbon.

In step 331, the pyrolyzed material may be flat press or roll press laminated on the current collector, where for aluminum foil for the cathode and copper foil for the anode may be pre-coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the active material composite film may be laminated to the coated aluminum or copper using a heated hydraulic press (30-70 seconds, 250-350° C., and 3000-5000 psi), thereby forming the finished composite electrode. In another embodiment, the pyrolyzed material may be roll-press laminated to the current collector.

In step 333, the electrodes may then be sandwiched with a separator and electrolyte to form a cell. The cell may be subjected to a formation process, comprising initial charge and discharge steps to lithiate the anode, with some residual lithium remaining, and testing to assess cell performance.

In some aspects, energy storage devices such as batteries are provided. In some embodiments, the energy storage device includes a first electrode and a second electrode, wherein at least one of the first electrode and the second electrode is a Si-based electrode. In some embodiments, the energy storage device includes a separator between the first electrode and the second electrode. In some embodiments, the cathode and/or anode may contain functional boron-containing chemicals as an additive. In other embodiments, the separator may contain functional boron-containing chemicals as an additive. In additional embodiments, the cathode and/or anode may be created using electrode slurries and may contain functional boron-containing chemicals that are added directly to electrode slurries to prepare directly coated electrodes. In some embodiments, the energy storage device includes an electrolyte. In some embodiments, the energy storage device includes at least one electrolyte additive comprising a functional boron-containing chemical. Advantages of using functional boron-containing chemicals as additives and/or modifiers include, but are not limited to, increased cycle life, increased rate capability and power density and/or decreased impedance increase in electrode interfaces.

In some embodiments, the second electrode is a Si-dominant electrode. In some embodiments, the second electrode comprises a self-supporting composite material film. In some embodiments, the composite material film comprises greater than 0% and less than about 95% by weight of silicon particles, and greater than 0% and less than about 90% by weight of one or more types of carbon phases, wherein at least one of the one or more carbon phases is a substantially continuous phase that holds the composite material film together such that the silicon particles are distributed throughout the composite material film.

In some embodiments, the battery may be capable of at least 200 cycles with more than 80% cycle retention when cycling with a C-rate of >2 C cycling between an upper voltage of >4V and a lower cut-off voltage of <3.3V. In other embodiments, the battery may be capable of at least 200 cycles with more than 80% cycle retention when cycling with a C-rate of >2 C cycling between an upper voltage of >4V and a lower cut-off voltage of <3.3V.

The below example devices and processes for device fabrication are generally described below, and the performances of lithium ion batteries with different electrodes, electrolytes and/or electrolyte additives may be evaluated.

1 wt % Lithium tetraphenylborate tris(1,2-dimethoxyethane) (LTPBT) and Vinylboronic anhydride pyridine complex (VAPC) may be used as cathode additives in a NCM811 cathode slurry to prepare NCM811 cathodes. The Si-dominant anode//NCM811 cathode coin full cells were built and tested at 1 C/0.5 C with the voltage window of 4.2V-3.1V.

Three-electrode cells (ECC-Ref, EL-Cell GmbH), containing a silicon-dominant anode and an NCM811 cathode may be assembled with the same electrolyte (100 µl) and a Celgard 2500 separator with the metallic lithium inserted into the cell as a reference electrode and used for galvanostatic electrochemical impedance spectroscopy (GEIS) and cycling tests. The Nyquist plots of the cathode were measured and the results were recorded when the cells were further charged to about 3.5V after the formation step and after per 5 times' fully cycling (charging/discharging) at 1 C/0.5 C with the voltage window of 4.2V-3.1V. The GEIS was performed over a frequency range of 100 kHz to 10 mHz Hz within EC-Lab® software and a sine amplitude of 0.37 mA.

FIG. 4. Nyquist plots of the NCM811 control (dotted line) and 1 wt % Lithium tetraphenylborate tris(1,2-dimethoxyethane) (LTPBT)-containing NCM811 cathode (solid line), -based coin half cells after the formation (4A), and after 5 cycles (4B), 10 cycles (4C), 25 cycles (4D), 50 cycles (4E), 100 cycles (4F), 130 cycles (4G), 150 cycles (4H), and 165 cycles (4I) cycling tests at 1 C/0.5 C with the voltage window of 4.2V-3.1V at room temperature.

Nyquist plots shown in FIG. 4 have an intercept at high frequency (bulk resistance, used to evaluate the electronic conductivity), followed by a depressed semicircle in the high and mid-frequency regions (this can be generally considered as charge transfer resistance indicating the diffusion capability of the Li-ions at the cathode/electrolyte interface). With cycling, the depressed semicircle split into two at the high and mid-frequencies. The smaller semicircle at the high frequencies may be attributed to the interfacial contacts within the NCM811 cathode, such as the ionic resistance of the electrolyte, the passivation layer on top of the NCM811 active material or the electrode-current collector interface. The second semicircle in the middle-frequency range might come from the charge transfer resistance of the NCM811 cathode. Additionally, the cells also show a diffusion line at low frequencies which is the Warburg impedance related to the lithium diffusion in the active electrodes. The presence of LiTPBT may help increase the electrode electronic conductivity and reduce the bulk resistance. Overall, the LiTPBT-containing NCM811 cathodes show lower interfacial and charge transfer resistance and less resistance increase compared with the control.

Figure 5:
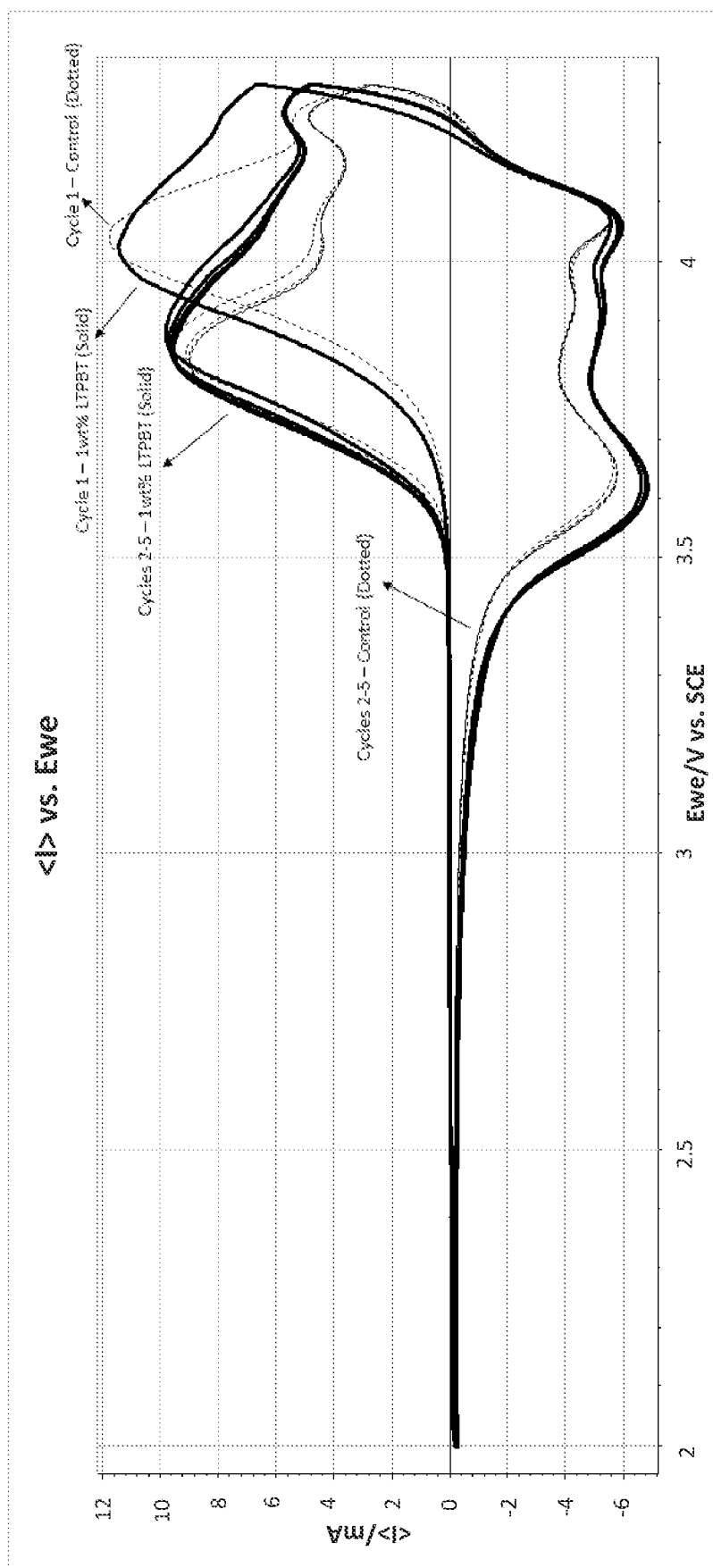
FIG. 5 shows cyclic voltammetry (CV) curves of NCM811 cathode-based coin half cells. The cathode used may be: (dotted line)—NCM811 Control, (solid line)—1 wt % Lithium tetraphenylborate tris(1,2-dimethoxyethane) (LTPBT)-containing NCM811, in accordance with an example embodiment of the disclosure.

FIG. 5. Cyclic voltammetry (CV) curves of NCM811 cathode-based coin half cells. The cathode used may be: (dotted line)—NCM811 Control, (solid line)—1 wt % Lithium tetraphenylborate tris(1,2-dimethoxyethane) (LTPBT)-containing NCM811. The electrolyte formulation used may be 1.2 M LiPF6 in FEC/EMC (3/7 wt %). The control cathodes contain about 92 wt % NCM811, 4 wt % Super P and 4 wt % PVDF5130, and may be coated on 15 μm Al foil. The average loading may be about 20-30 mg/cm$^2$. The 1 wt % LTPBT-containing NCM811 cathodes contain about 91 wt % NCM811, 1 wt % LTPBT, 4 wt % Super P and 4 wt % PVDF5130, and may be coated on 15 μm Al foil with a similar loading with control. The CV measurements may be carried out in the voltage range of 2-4.3 V at a scan rate of 0.2 mV s-1 using VMP3 equipment.

FIG. 5 shows that a clear oxidation peak appears at ~4.1 V (vs. Li/Li+) for the cell with LTPBT-free NCM811 cathode (control) in the initial charge. This peak for 1 wt % LTPBT-containing NCM811 cathode-based cell downshifts to ~3.85 V (vs. Li/Li+) in the initial charge. In the following scanning cycles, the oxidation and reduction peaks for the 1 wt % LTPBT-containing NCM811 half cells are at the similar positions with the control. FIG. 5 indicates that 1 wt % LTPBT is able to reduce the polarization of the charging and discharging processes of NCM811 cathode half cells. This may produce reduced interfacial impedance and enhanced cycling performance of Si-dominant anode//NCM811 cathode full cells.

Figure 6A:
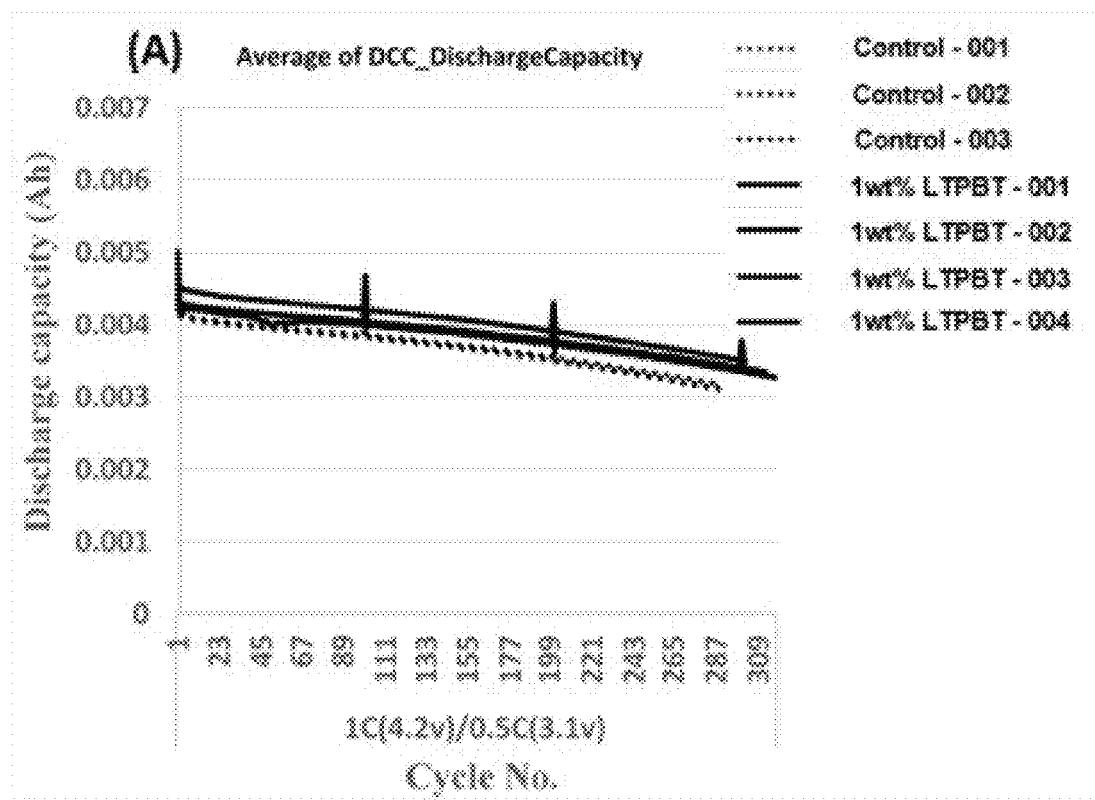
FIGS. 6A and 6B show the capacity retention (FIG. 6A) and normalized capacity retention (FIG. 6B) of Si-dominant anode//NCM811 cathode coin full cells. The cathode used may be: (dotted line)—NCM811 Control, (solid line)—1 wt % Lithium tetraphenylborate tris(1,2-dimethoxyethane) (LTPBT), in accordance with an example embodiment of the disclosure.
Figure 6B:
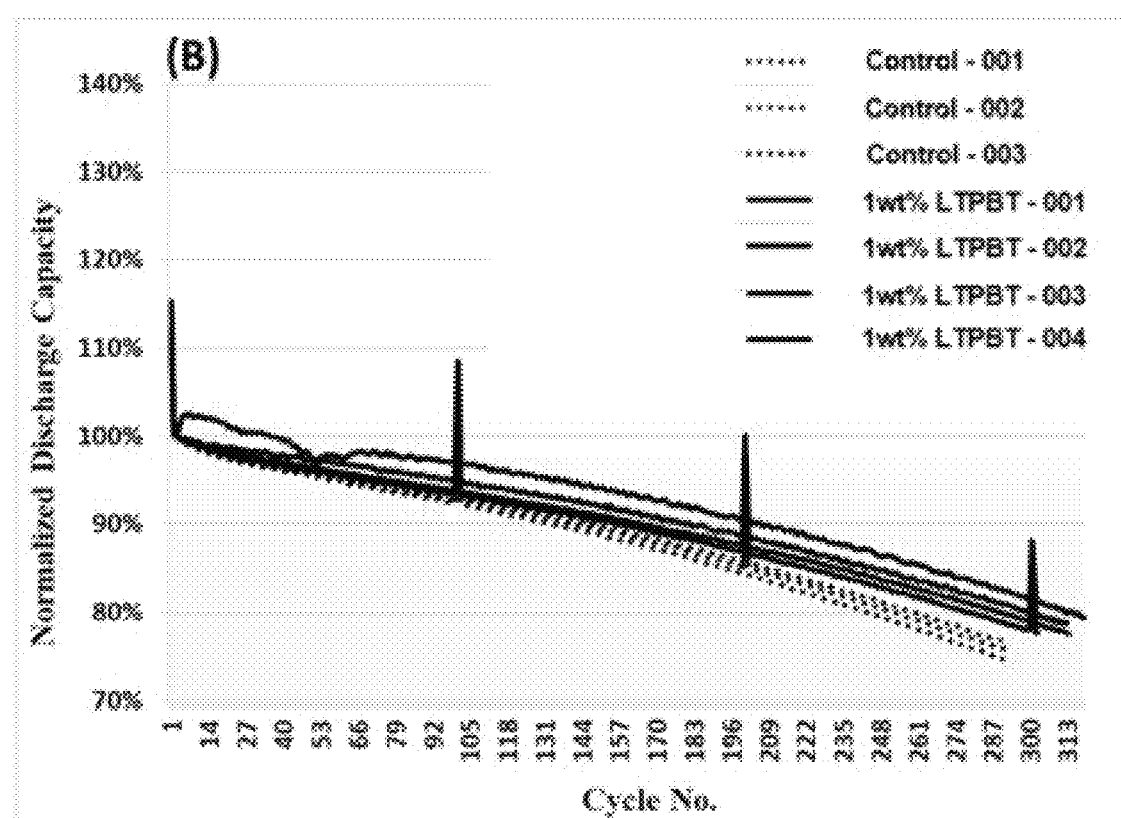

FIG. 6. Capacity retention (FIG. 6A) and Normalized capacity retention (FIG. 6B) of Si-dominant anode//NCM811 cathode coin full cells. The cathode used may be: (dotted line)—NCM811 Control, (solid line)—1 wt % Lithium tetraphenylborate tris(1,2-dimethoxyethane) (LTPBT). The Si-dominant anodes contain about 80 wt % Si, 5 wt % graphite and 15 wt % glassy carbon (from resin) and may be laminated on 15 μm Cu foil. The average loading may be about 2-5 mg/cm$^2$. The control cathodes contain about 92 wt % NCM811, 4 wt % Super P and 4 wt % PVDF5130, and may be coated on 15 μm Al foil. The average loading may be about 20-30 mg/cm$^2$. The 1 wt % LTPBT-containing NCM811 cathodes contain about 91 wt % NCM811, 1 wt % LTPBT, 4 wt % Super P and 4 wt % PVDF5130, and may be coated on 15 μm Al foil with a similar loading with control. The cells may be tested at 25° C.

The long-term cycling program may include: (i) At the 1st cycle, Charge at 0.33 C to 4.2 V until 0.05 C, rest 5 minutes, discharge at 0.33 C to 3.1 V, rest 5 minutes; and (ii) from the 2nd cycle, Charge at 1 C to 4.2 V until 0.05 C, rest 5 minutes, discharge at 0.5 C to 3.1 V, rest 5 minutes. After every 100 cycles, the test conditions in the 1st cycle may be repeated.

FIG. 6 indicates the 1 wt % LTPBT-containing NCM811 cathode-based coin full cells have better cycle performance than the control. In addition, the additive-containing cathode-based cells also have higher discharge capacity than the control.

Figure 7:
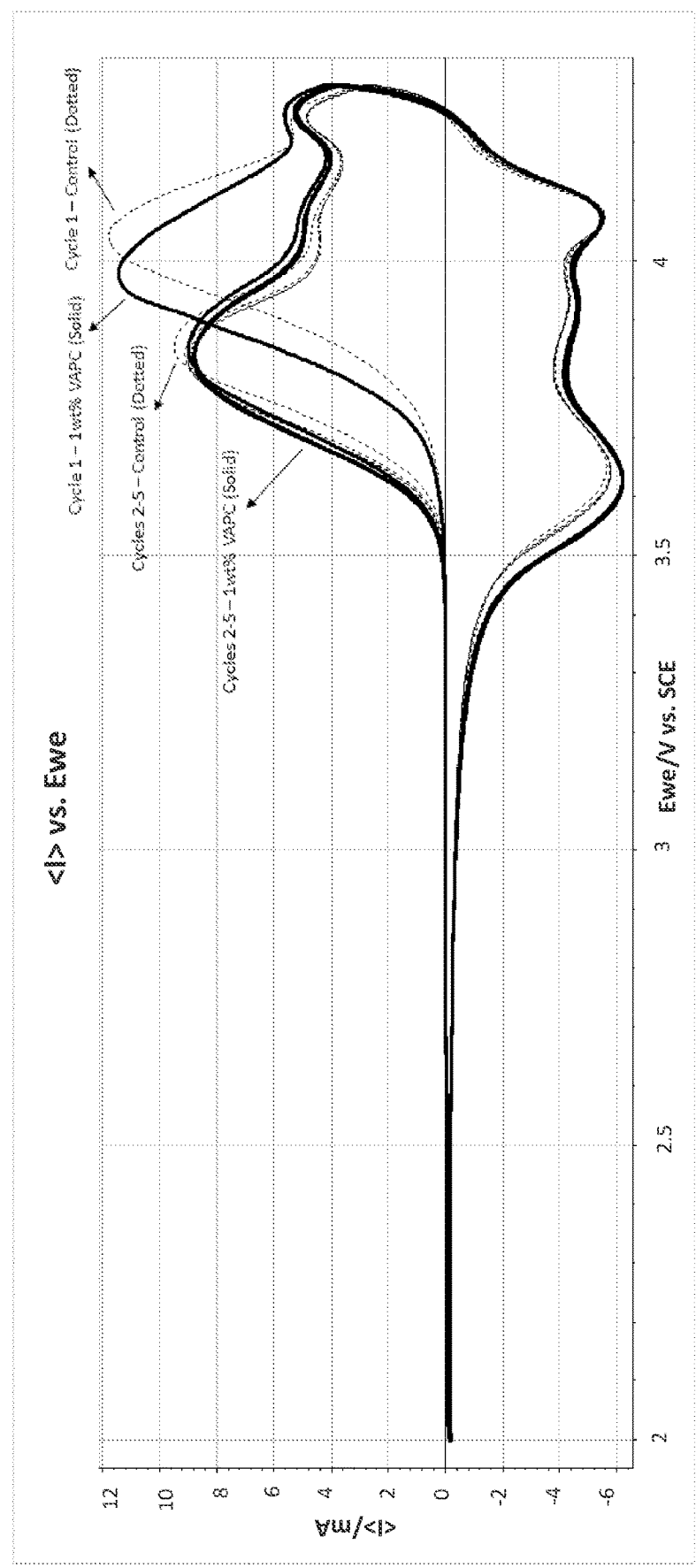
FIG. 7 shows cyclic voltammetry (CV) curves of Si-dominant anode//NCM811 cathode full cells. The cathode used were: (dotted line)—NCM811 Control, (solid line)—1 wt % Vinylboronic anhydride pyridine complex (VAPC)-containing NCM811, in accordance with an example embodiment of the disclosure.

FIG. 7. Cyclic voltammetry (CV) curves of Si-dominant anode//NCM811 cathode full cells. The cathode used may be: (dotted line)—NCM811 Control, (solid line)—1 wt % Vinylboronic anhydride pyridine complex (VAPC)-containing NCM811. The electrolyte formulation used may be 1.2 M LiPF6 in FEC/EMC (3/7 wt %). The Si-dominant anodes contain about 80 wt % Si, 5 wt % graphite and 15 wt % glassy carbon (from resin) and may be laminated on 15 μm Cu foil. The average loading may be about 2-5 mg/cm$^2$. The control cathodes contain about 92 wt % NCM811, 4 wt % Super P and 4 wt % PVDF5130, and may be coated on 15 μm Al foil. The average loading may be about 20-30 mg/cm$^2$. The 1 wt % VAPC-containing NCM811 cathodes contain about 91 wt % NCM811, 1 wt % Vinylboronic anhydride pyridine complex, 4 wt % Super P and 4 wt % PVDF5130, and may be coated on 15 μm Al foil with a similar loading with control. The CV measurements may be carried out in the voltage range of 2-4.3 V at a scan rate of 0.2 mV s-1 using VMP3 equipment.

FIG. 7 shows that there is a clear oxidation peak appears at ~4.1 V (vs. Li/Li+) for the cell with VAPC-free NCM811 cathode (control) in the initial charge. This peak for 1 wt % VAPC-containing NCM811 cathode-based cell is slightly <4.0 V (vs. Li/Li+) in the initial charge. In the following scanning cycles, the oxidation and reduction peaks for the 1 wt % VAPC-containing NCM811 half cells are at the similar positions with the control ones. FIG. 7 indicates that 1 wt % VAPC is able to reduce the polarization of the charging and discharging processes of NCM811 cathode half cells. This may produce reduced interfacial impedance and enhanced cycling performance of Si-dominant anode//NCM811 cathode full cells.

Figure 8A:
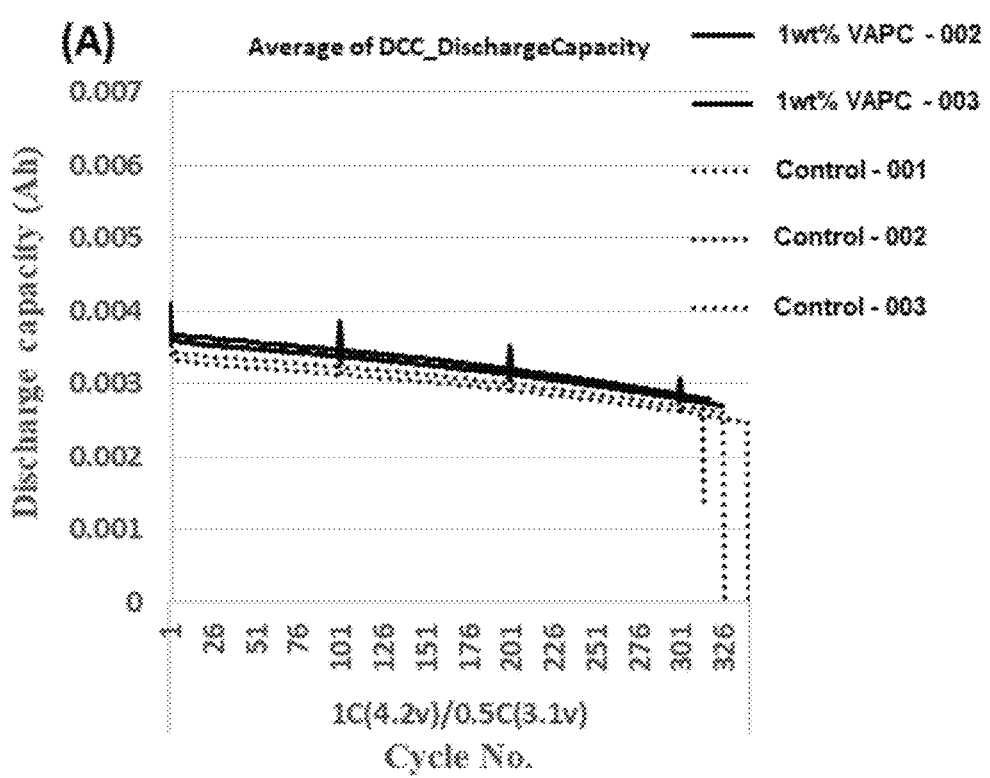
FIGS. 8A and 8B show the capacity retention (FIG. 8A) and normalized capacity retention (FIG. 8B) of Si-dominant anode//NCM811 cathode coin full cells. The cathode used may be: (dotted line)—NCM811 Control, (solid line)—1 wt % Vinylboronic anhydride pyridine complex (VAPC)-containing NCM811, in accordance with an example embodiment of the disclosure.
Figure 8B:
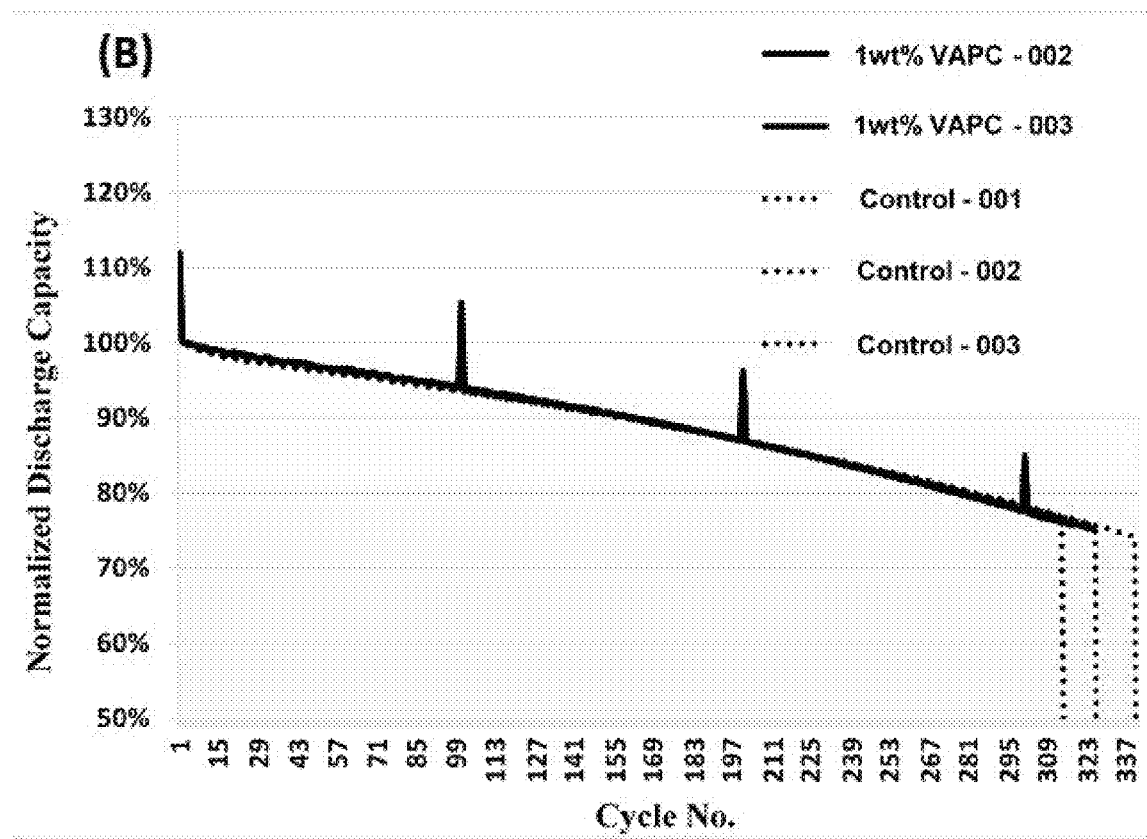

FIG. 8. Capacity retention (FIG. 8A) and Normalized capacity retention (FIG. 8B) of Si-dominant anode//NCM811 cathode coin full cells. The cathode used may be: (dotted line)—NCM811 Control, (solid line)—1 wt % Vinylboronic anhydride pyridine complex (VAPC)-containing NCM811. The Si-dominant anodes contain about 80 wt % Si, 5 wt % graphite and 15 wt % glassy carbon (from resin) and may be laminated on 15 μm Cu foil. The average loading may be about 2-5 mg/cm$^2$. The control cathodes contain about 92 wt % NCM811, 4 wt % Super P and 4 wt % PVDF5130, and may be coated on 15 μm Al foil. The average loading may be about 20-30 mg/cm$^2$. The 1 wt % Vinylboronic anhydride pyridine complex-containing NCM811cathodes contain about 91 wt % NCM811, 1 wt % VAPC, 4 wt % Super P and 4 wt % PVDF5130, and may be coated on 15 μm Al foil with a similar loading with control. The cells may be tested at 25° C.

The long-term cycling programs may be the same as shown in FIG. 6.

FIG. 8 indicates the 1 wt % VAPC-containing NCM811 cathode-based coin full cells have similar cycle performance with the control. However, the 1 wt % VAPC-containing NCM811 cathode-based coin full cells have higher discharge capacity than the control.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. An energy storage device comprising:
   an anode and a cathode, where at least one of the anode or the cathode contains an electrode additive;
   a separator between the anode and the cathode; and
   an electrolyte composition; wherein said electrode additive comprises at least one boron-containing compound; and
   wherein the boron-containing compound comprises one or more of: Cyclopropylboronic acid MIDA ester (CAS 1104637-36-6); 2-cyclobutyl-6-methyl-1,3,6,2-dioxazaborocane-4,8-dione (CAS: 1104637-37-7); 2-cyclopentyl-6-methyl-1,3,6,2-dioxazaborocane-4,8-dione (CAS: 117311-84-9); 2-cyclohexyl-6-methyl 1,3,6,2-dioxazaborocane-4,8-dione (CAS: 1104637-39-9); anhydride; Thiophene-2-boronic acid pinacol ester; 4-Methylthiophene-3-boronic acid pinacol ester; 3-(5, 5-Dimethyl-1,3,2-dioxaborinan-2-yl) pyridine; 3-Cyano-1-propylboronic acid pinacol ester; Cyclopropylboronic acid pinacol ester; Cyclohexylboronic acid pinacol ester; Pyridine-3-boronic acid 1,3-propanediol ester; 2,5-Difluoropyridine-4-boronic acid, pinacol ester (CAS: 1622217-35-9); or 2,6-Difluoropyridine-3, 5-diboronic acid, pinacol ester (CAS: 1218789-90-2).

2. The energy storage device of claim 1, wherein the anode is a Si-dominant electrode.

3. The energy storage device of claim 1, wherein the cathode comprises one or more of: nickel cobalt aluminum oxide (NCA), nickel cobalt manganese oxide (NCM), lithium iron phosphate (LFP), lithium cobalt oxide (LCO), lithium manganese oxide (LMO), Ni-rich layered oxides ($LiNi_{1-x}MxO_2$, Mn=Co, Mn, and Al), Li-rich, $xLi_2MnO_3 \cdot (1-x)LiNi_aCobMn_cO_2$, Li-rich layered oxides ($LiNi_{1+x}M_{1-x}O_2$, Mn=Co, Mn, and Ni), or high-voltage spinel oxides ($LiNi_{0.5}Mn_{1.5}O_4$).

4. The energy storage device of claim 1, wherein said electrode additive comprises 5% or less by weight of the active material of the electrode.

5. The energy storage device of claim 4, wherein said electrode additive comprises 1% or less by weight of the active material of the electrode.

6. The energy storage device of claim 2, wherein the anode comprises an active material that comprises between about 50% to about 95% silicon by weight.

7. The energy storage device of claim 1, wherein the energy storage device comprises a lithium ion battery.

8. The energy storage device of claim 1, wherein the electrolyte comprises a liquid, solid, or gel.

9. An energy storage device comprising:
a first electrode and a second electrode, wherein at least one of the first electrode and the second electrode is a Si-based electrode;
a separator between the first electrode and the second electrode; and
an electrolyte composition; wherein
said electrolyte composition comprises at least one electrolyte additive comprising a boron-containing compound; and
wherein the boron-containing compound comprises one or more of: Cyclopropylboronic acid MIDA ester (CAS 1104637-36-6); 2-cyclobutyl-6-methyl-1,3,6,2-dioxazaborocane-4,8-dione (CAS: 1104637-37-7); 2-cyclopentyl-6-methyl-1,3,6,2-dioxazaborocane-4,8-dione (CAS: 117311-84-9); Phenylboronic acid trimeric anhydride; Thiophene-2-boronic acid pinacol ester; 4-Methylthiophene-3-boronic acid pinacol ester; 3-(5, 5-Dimethyl-1,3,2-dioxaborinan-2-yl) pyridine; 3-Cyano-1-propylboronic acid pinacol ester; Cyclopropylboronic acid pinacol ester; Cyclohexylboronic acid pinacol ester; Pyridine-3-boronic acid 1,3-propanediol ester; 2,5-Difluoropyridine-4-boronic acid, pinacol estser (CAS: 1622217-35-9); or 2,6-Difluoropyridine-3, 5-diboronic acid, pinacol ester (CAS: 1218789-90-2).

10. The energy storage device of claim 9, wherein the second electrode comprises an active material that comprises between about 50% to about 95% silicon.

11. The energy storage device of claim 9, wherein the energy storage device comprises a lithium ion battery.

12. The energy storage device of claim 9, wherein the electrolyte composition comprises a liquid, solid, or gel.

13. The energy storage device of claim 9, wherein the second electrode comprises a self-supporting composite material film.

14. The energy storage device of claim 13, wherein the composite material film comprises:
greater than 0% and less than about 95% by weight of silicon particles, and
greater than 0% and less than about 90% by weight of one or more types of carbon phases, wherein at least one of the one or more types of carbon phases is a substantially continuous phase that holds the composite material film together such that the silicon particles are distributed throughout the composite material film.

15. A method of forming an energy storage device, the method comprising:
forming an energy storage device comprising a cathode, an electrolyte composition, and an anode;
wherein said one or more of said cathode or said anode and/or said electrolyte composition comprise an additive compound;
said additive compound comprising a boron-containing compound;
wherein said one or both of said cathode and said anode is formed using, at least, the following steps:
said electrode active material is mixed to create a slurry;
said electrolyte composition is added to said slurry;
said slurry is coated on metal foil; and
the coated metal foil is dried; and
wherein the boron-containing compound comprises one or more of: Cyclopropylboronic acid MIDA ester (CAS 1104637-36-6); 2-cyclobutyl-6-methyl-1,3,6,2-dioxazaborocane-4,8-dione (CAS: 1104637-37-7); 2-cyclopentyl-6-methyl-1,3,6,2-dioxazaborocane-4,8-dione (CAS: 117311-84-9); 2-cyclohexyl-6-methyl-1,3,6,2-dioxazaborocane-4,8-dione (CAS: 1104637-39-9); anhydride; Thiophene-2-boronic acid pinacol ester; 4-Methylthiophene-3-boronic acid pinacol ester; 3-(5,5-Dimethyl-1,3,2-dioxaborinan-2-yl) pyridine; 3-Cyano-1-propylboronic acid pinacol ester; Cyclopropylboronic acid pinacol ester; Cyclohexylboronic acid pinacol ester; Pyridine-3-boronic acid 1,3-propanediol ester; 2,5-Difluoropyridine-4-boronic acid, pinacol estser (CAS: 1622217-35-9); or 2,6-Difluoropyridine-3,5-diboronic acid, pinacol ester (CAS: 1218789-90-2).

16. The method of claim 15, wherein the anode is a Si-dominant electrode.

17. The method of claim 15, wherein the anode comprises a self-supporting composite material film.

18. The method of claim 17, wherein the composite material film comprises:
greater than 0% and less than about 95% by weight of silicon particles, and
greater than 0% and less than about 90% by weight of one or more types of carbon phases, wherein at least one of the one or more types of carbon phases is a substantially continuous phase that holds the composite material film together such that the silicon particles are distributed throughout the composite material film.

* * * * *